US012724610B2

(12) United States Patent
Doi et al.

(10) Patent No.: US 12,724,610 B2
(45) Date of Patent: Sep. 1, 2026

(54) SIMULATION APPARATUS, SIMULATION METHOD, AND NON-TRANSITORY COMPUTER READABLE MEDIUM

(71) Applicant: Renesas Electronics Corporation, Tokyo (JP)

(72) Inventors: Masahiro Doi, Tokyo (JP); Eiichi Arai, Tokyo (JP); Tomoki Yonehana, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 44 days.

(21) Appl. No.: 19/021,511

(22) Filed: Jan. 15, 2025

(65) Prior Publication Data

US 2025/0306933 A1 Oct. 2, 2025

(30) Foreign Application Priority Data

Mar. 26, 2024 (JP) ................................. 2024-049180

(51) Int. Cl.
*G06F 9/30* (2018.01)
*G06F 9/32* (2018.01)
*G06F 9/38* (2018.01)
*G06F 11/34* (2006.01)

(52) U.S. Cl.
CPC ...... *G06F 9/30065* (2013.01); *G06F 9/30145* (2013.01); *G06F 9/30189* (2013.01); *G06F 9/321* (2013.01)

(58) Field of Classification Search
CPC .. G06F 9/30145; G06F 9/30065; G06F 9/381; G06F 11/3409; G06F 11/3457
See application file for complete search history.

(56) References Cited

U.S. PATENT DOCUMENTS

| | | | | |
|---|---|---|---|---|
| 8,904,155 | B2 * | 12/2014 | Dieffenderfer | G06F 9/3848 712/240 |
| 2005/0102659 | A1 * | 5/2005 | Singh | G06F 9/30065 712/E9.058 |
| 2006/0107028 | A1 * | 5/2006 | Meuwissen | G06F 9/325 712/E9.035 |
| 2007/0113057 | A1 * | 5/2007 | Knoth | G06F 1/3203 712/E9.058 |
| 2007/0113059 | A1 * | 5/2007 | Tran | G06F 9/381 712/E9.058 |
| 2008/0086621 | A1 * | 4/2008 | Ogura | G06F 9/381 712/E9.058 |

(Continued)

OTHER PUBLICATIONS

Leonardo R. Bachega, Jose R. Brunhemto, Luiz DeRose, Pedro Mindlin, and Jose E. Moreira; "The BlueGene/L Pseudo Cycle-accurate Simulator" (Year: 2004).*

*Primary Examiner* — Jacob Petranek
(74) *Attorney, Agent, or Firm* — RIMON P.C.

(57) ABSTRACT

A simulation apparatus includes a loop instruction sequence detector and an instruction computing section. The loop instruction sequence detector detects a loop instruction sequence included in a target program and generates a loop instruction sequence detection signal. When the loop instruction sequence detection signal is generated, the instruction computing section executes the loop instruction sequence once and generates a simulation elapsed time required for executing the loop instruction sequence a predetermined number of times.

20 Claims, 16 Drawing Sheets

(56) References Cited

U.S. PATENT DOCUMENTS

| | | | | |
|---|---|---|---|---|
| 2009/0144746 | A1* | 6/2009 | Song | G06F 9/4818 718/105 |
| 2012/0151463 | A1* | 6/2012 | Kalogeropulos | G06F 8/452 717/160 |
| 2012/0166765 | A1* | 6/2012 | Gonion | G06F 9/3838 712/205 |
| 2015/0089141 | A1* | 3/2015 | Chen | G06F 9/30047 711/125 |
| 2020/0150965 | A1* | 5/2020 | Okazaki | G06F 9/3016 |
| 2021/0357549 | A1 | 11/2021 | Yoshinaga et al. | |
| 2023/0205535 | A1* | 6/2023 | Al Sheikh | G06F 9/325 712/214 |
| 2023/0350683 | A1* | 11/2023 | Li | G06F 9/30069 |

* cited by examiner 2
22
MEMORY MODEL
TARGET PROGRAM
EXECUTION LOG
CPU MODEL
SIMULATION CONTROLLER
21
23

FIG. 5

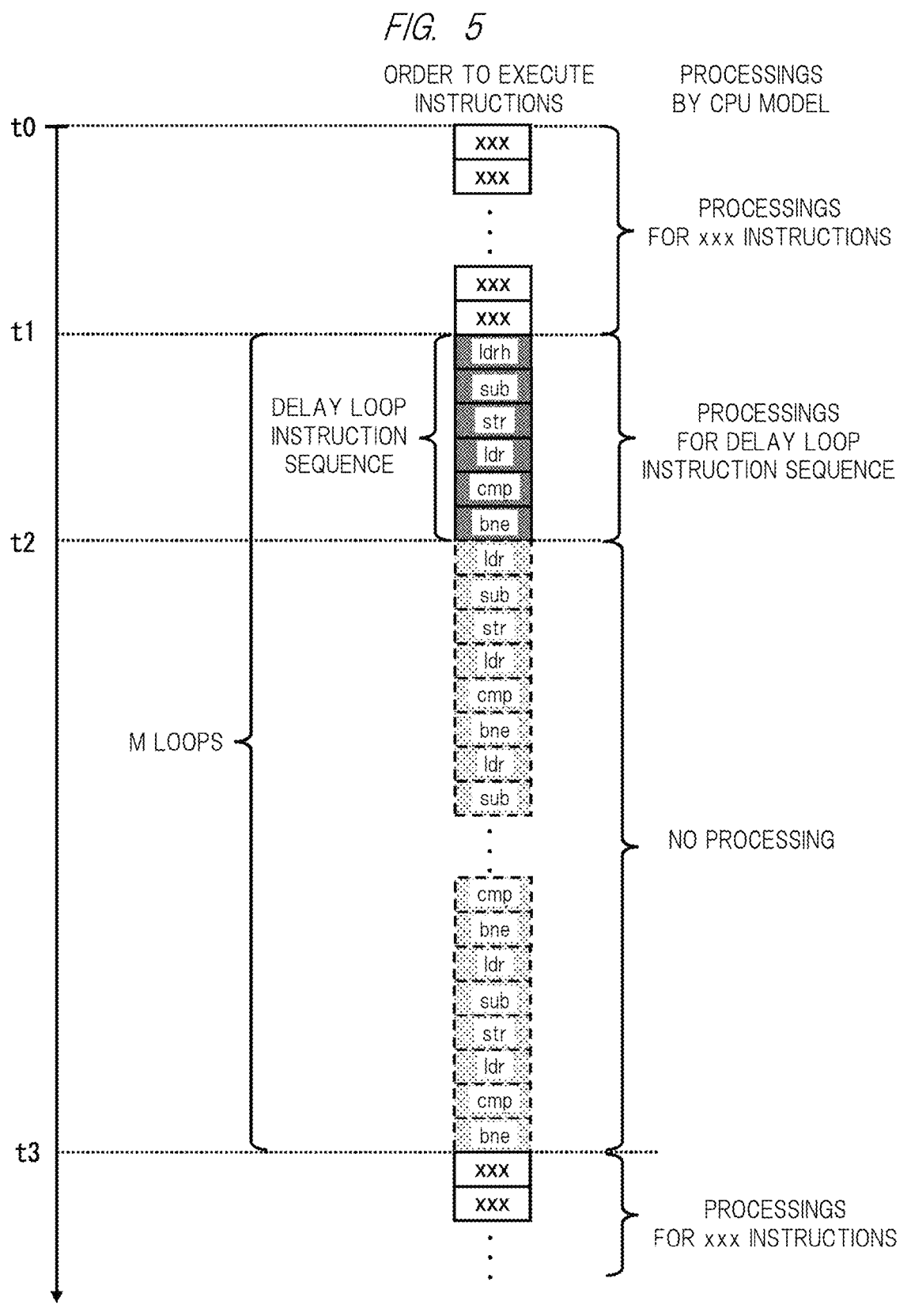

ORDER TO EXECUTE INSTRUCTIONS

PROCESSINGS BY CPU MODEL t0 xxx
xxx
xxx
xxx

PROCESSINGS FOR xxx INSTRUCTIONS t1

DELAY LOOP INSTRUCTION SEQUENCE ldrh
sub
str
ldr
cmp
bne

PROCESSINGS FOR DELAY LOOP INSTRUCTION SEQUENCE t2

M LOOPS ldr
sub
str
ldr
cmp
bne
ldr
sub cmp
bne
ldr
sub
str
ldr
cmp
bne

NO PROCESSING t3 xxx
xxx

PROCESSINGS FOR xxx INSTRUCTIONS 2a
22
MEMORY MODEL
TARGET PROGRAM
EXECUTION LOG
24
TIMER MODEL
STATE FLAG
CPU MODEL
SIMULATION CONTROLLER
21a
23

FIG. 12

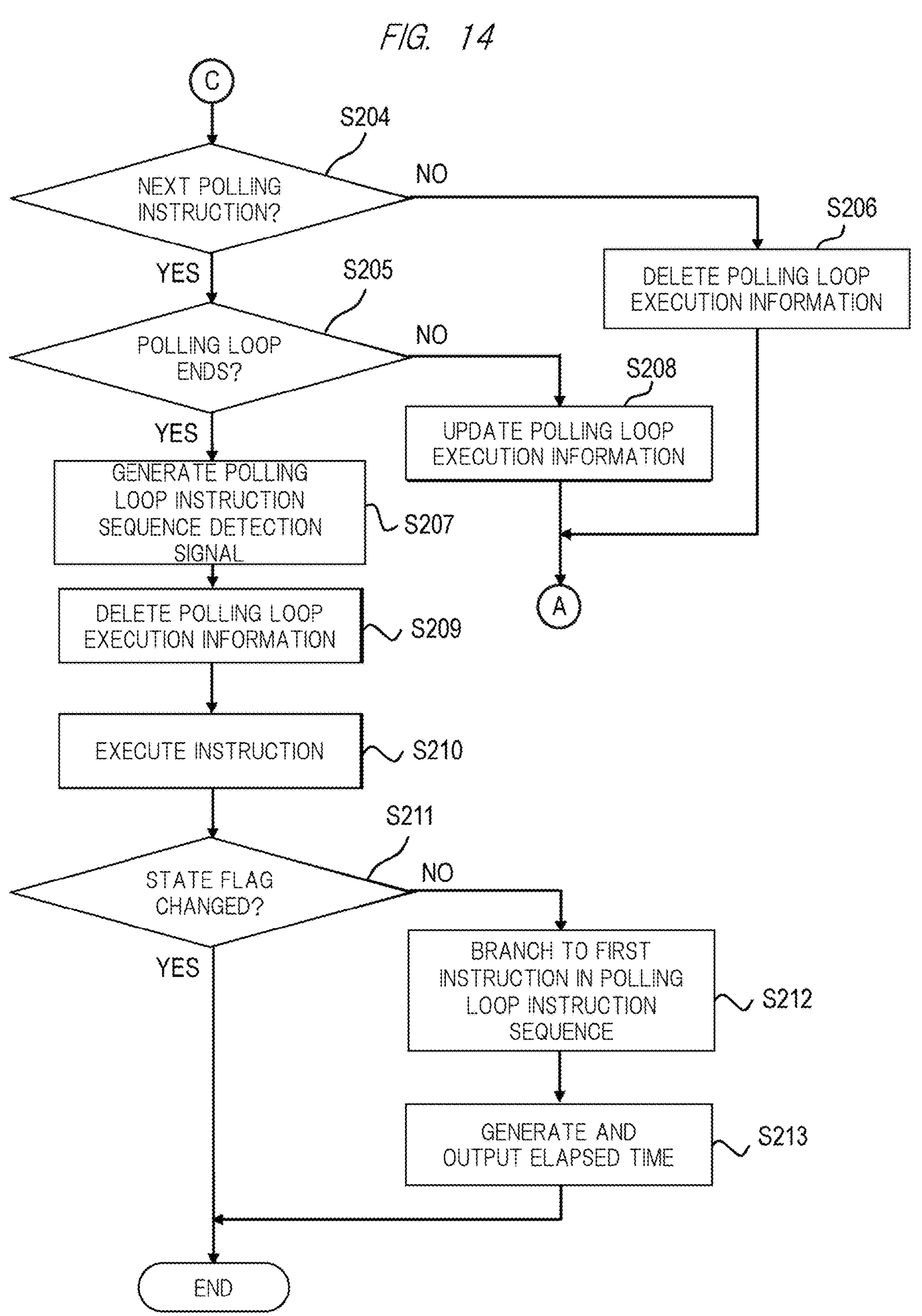
FIG. 14
C
S204
NEXT POLLING INSTRUCTION?
NO
YES
S206
DELETE POLLING LOOP EXECUTION INFORMATION
S205
POLLING LOOP ENDS?
NO
YES
S208
UPDATE POLLING LOOP EXECUTION INFORMATION
GENERATE POLLING LOOP INSTRUCTION SEQUENCE DETECTION SIGNAL
S207
A
DELETE POLLING LOOP EXECUTION INFORMATION
S209
EXECUTE INSTRUCTION
S210
S211
STATE FLAG CHANGED?
NO
YES
BRANCH TO FIRST INSTRUCTION IN POLLING LOOP INSTRUCTION SEQUENCE
S212
GENERATE AND OUTPUT ELAPSED TIME
S213
END

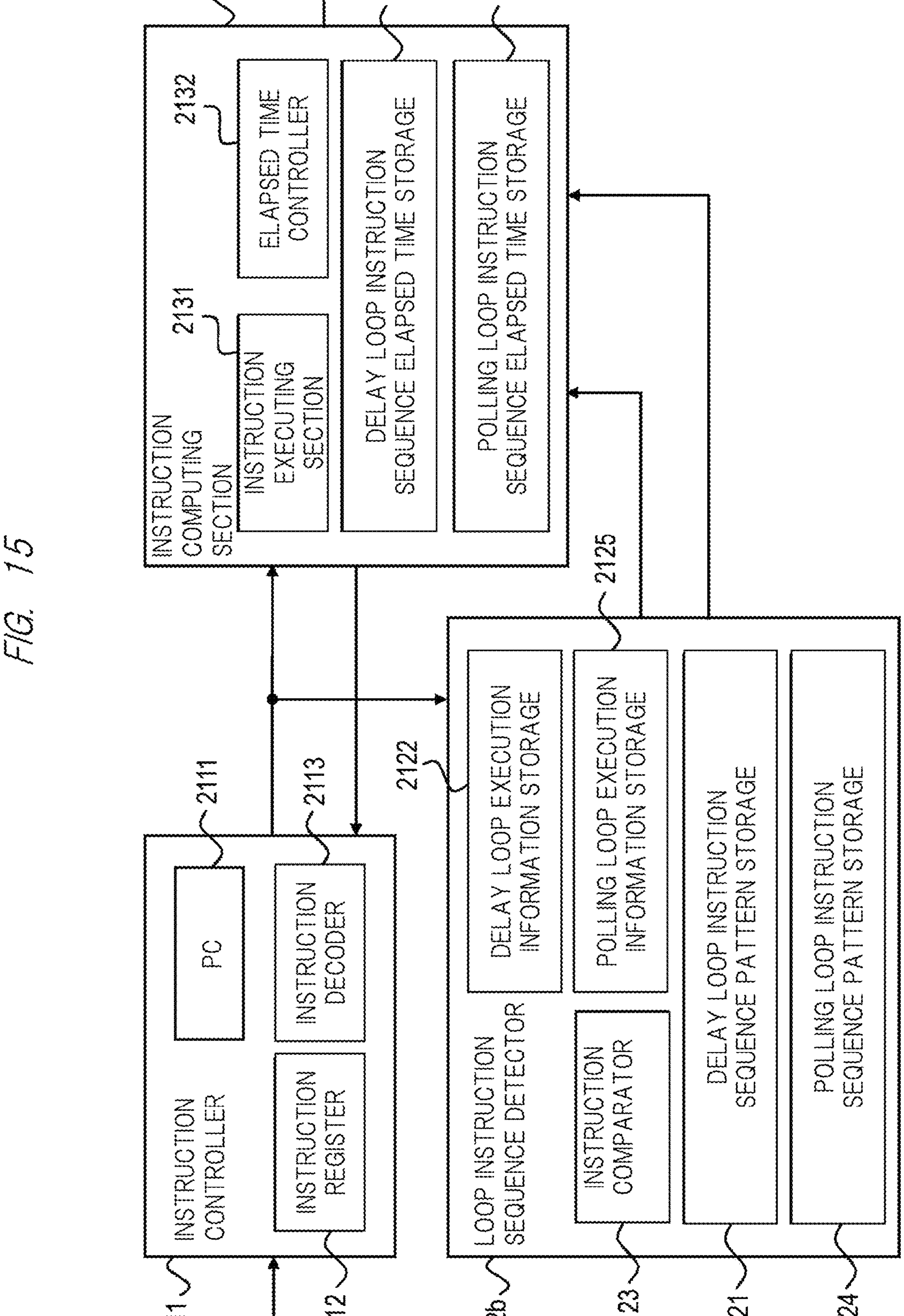
FIG. 15
21b
213b
2133
2134
2132
2131
INSTRUCTION COMPUTING SECTION
INSTRUCTION EXECUTING SECTION
ELAPSED TIME CONTROLLER
DELAY LOOP INSTRUCTION SEQUENCE ELAPSED TIME STORAGE
POLLING LOOP INSTRUCTION SEQUENCE ELAPSED TIME STORAGE
2125
2122
2111
2113
INSTRUCTION CONTROLLER
PC
INSTRUCTION REGISTER
INSTRUCTION DECODER
211
2112
LOOP INSTRUCTION SEQUENCE DETECTOR
DELAY LOOP EXECUTION INFORMATION STORAGE
POLLING LOOP EXECUTION INFORMATION STORAGE
INSTRUCTION COMPARATOR
DELAY LOOP INSTRUCTION SEQUENCE PATTERN STORAGE
POLLING LOOP INSTRUCTION SEQUENCE PATTERN STORAGE
212b
2123
2121
2124

START
FETCH INSTRUCTION
S101
DECODE INSTRUCTION
S102
S103
DELAY LOOP BEING EXECUTED?
NO
YES
B
S201
POLLING LOOP BEING EXECUTED?
NO
YES
C
S104
DELAY LOOP STARTED?
NO
YES
S105
GENERATE DELAY LOOP EXECUTION INFORMATION
S202
POLLING LOOP STARTED?
NO
YES
GENERATE POLLING LOOP EXECUTION INFORMATION
S203
A

SIMULATION APPARATUS, SIMULATION METHOD, AND NON-TRANSITORY COMPUTER READABLE MEDIUM

CROSS-REFERENCE TO RELATED APPLICATIONS

The disclosure of Japanese Patent Application No. 2024-049180 filed on Mar. 26, 2024 including the specification, drawings and abstract is incorporated herein by reference in its entirety.

BACKGROUND

The present disclosure relates to a simulation apparatus, a simulation method, and a non-transitory computer readable medium for storing a program.

In recent years, higher functionality and higher performance in in-vehicle electronic control units (ECUs) have been achieved along with the advancement of autonomous driving, electrification, and connected technique. Along with this, the scale and complexity of the electronic control software executed on in-vehicle ECUs have also been increasing. A software operation verifying system using a simulation apparatus is introduced into development of in-vehicle software in order to enhance development efficiency. A simulation apparatus used therefor is a hardware-simulated development environment and includes a central processing unit (CPU) model for executing software. Thus, in-vehicle software operations can be verified also in the early development phase in which an actual machine for ECU for executing in-vehicle software is not ready.

There are disclosed techniques listed below.

[Patent Document 1] US Patent Application Publication No. 2021/0357549.

For example, Patent Document 1 discloses an example of such simulation apparatuses. The Patent Document 1 discloses a simulation apparatus in which a core section being a simulation model executes a target program.

SUMMARY

A simulation apparatus sequentially executes instructions included in a software program to be verified, and accordingly a state of a CPU model changes. The CPU model outputs data such as log or status (referred to as an execution log below) depending on a processing performed in response to an executed instruction. Whether a state of the CPU model is to be shifted is confirmed based on an output execution log thereby verifying an operation of the software.

Operations of the software are verified by executing instructions included in the software program, and as the software program to be verified is longer, it takes a longer time to verify the operations. As described above, due to the increase in scale and complexity in-vehicle software, a reduction in time to verify software operations by use of a simulation apparatus has been awaited.

Other objects and novel features will become apparent from the description of the present specification and the drawings.

A simulation apparatus according to one aspect includes a loop instruction sequence detector and an instruction computing section. The loop instruction sequence detector detects a loop instruction sequence included in a target program and generates a loop instruction sequence detection signal. When the loop instruction sequence detection signal is generated, the instruction computing section executes the loop instruction sequence once and generates a simulation elapsed time required for executing the loop instruction sequence a predetermined number of times.

According to the present disclosure, a time to take for a simulation can be reduced thereby achieving the reduction in a time to verify an operation of software.

BRIEF DESCRIPTION OF THE DRAWINGS

FIG. 5 is a diagram illustrating an example of an order to execute a plurality of instructions including delay loop instruction sequences.

FIG. 12 is a diagram illustrating an example of an order to execute a plurality of instructions including polling loop instruction sequences.

FIG. 14 is a flowchart illustrating the example of the flow of instruction executing processings by the CPU model according to the second embodiment.

FIG. 15 is a block diagram illustrating a configuration example of a CPU model according to a third embodiment.

DETAILED DESCRIPTION

Figure 1:
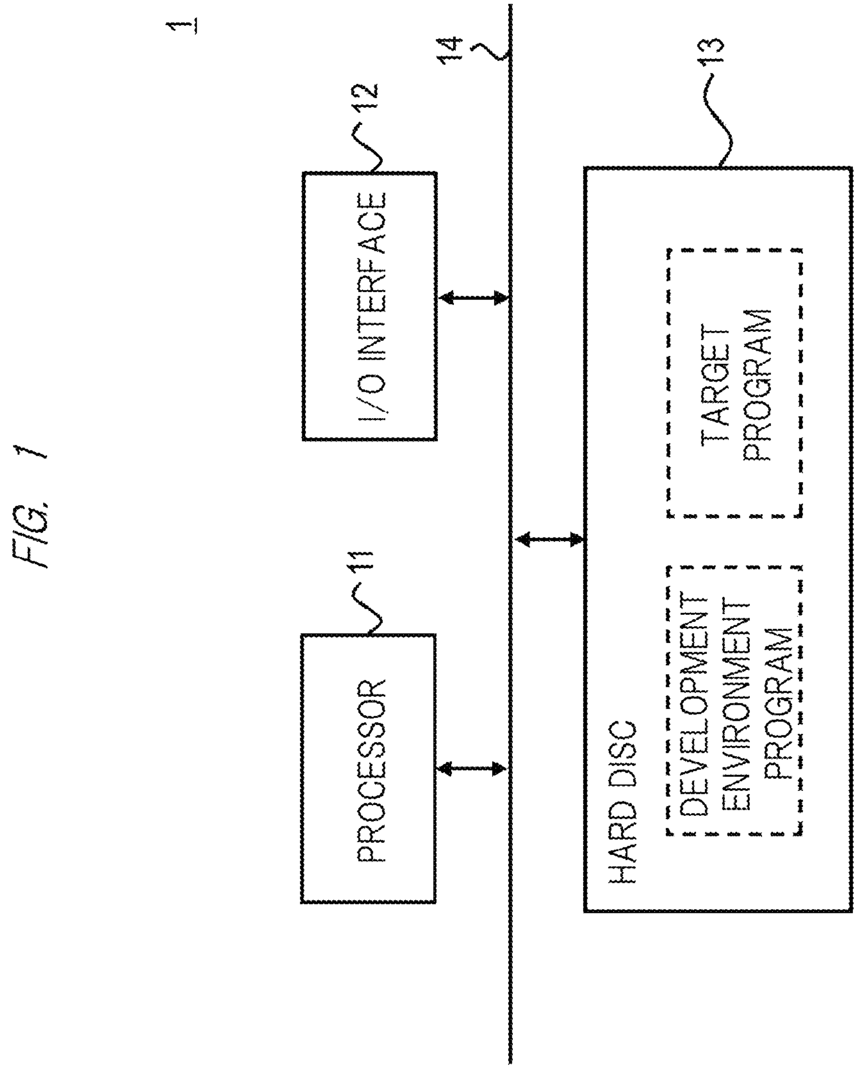
FIG. 1 is a block diagram illustrating a configuration example of a computer which implements simulation apparatuses according to embodiments of the present disclosure.

Embodiments will be described below in detail with reference to the drawings. Like components are denoted with like reference numerals and will not be repeatedly described in the present specification and the drawings. Components may be omitted or simplified for explanation in the drawings.

Programs may be stored in various types of non-transitory computer readable mediums or tangible storage mediums. Examples of non-transitory computer readable mediums and tangible storage mediums include, but are not limited to random access memory (RAM), read only memory (ROM), flash memory, solid state drive (SSD) or other types of memories, compact disc (CD)-ROM, digital versatile disc (DVD), Blue-ray (registered trademark) disc or other optical disc storages, magnetic cassette, magnetic tape, and magnetic disc storage or other magnetic storage devices. Programs may be transmitted on various types of transitory computer readable mediums or communication mediums. Examples of transitory computer readable mediums and communication mediums include, but are not limited to electric, optical, acoustic, or other forms of propagation signals.

First Embodiment

Simulation apparatuses according to a plurality of embodiments will be described in the present disclosure, and a computer executes a development environment program thereby implementing the simulation apparatuses according to the embodiments of the present disclosure. Similarly, the computer executes the development environment program thereby implementing simulation methods according to the embodiments of the present disclosure.

A simulation apparatus implemented by use of a computer will be described by way of example. FIG. 1 is a block diagram illustrating a configuration example of a computer 1 which implements simulation apparatuses according to a plurality of embodiments of the present disclosure. The computer 1 includes a processor 11, an input/output (I/O) interface 12, a hard disc 13, and a bus 14. The processor 11 and the I/O interface 12 are accessible to the hard disc 13 via the bus 14.

The hard disc 13 stores a development environment program and a software program to be verified (referred to as a target program below). The development environment program and the target program are input into the I/O interface 12 via various types of transitory or non-transitory computer readable mediums to be stored in the hard disc 13. The development environment program and the target program may be stored, not limited to a hard disc, in other types of non-transitory computer readable mediums.

The processor 11 reads and executes the development environment program from the hard disc 13 via the bus 14. Thereby, the simulation apparatuses and the simulation methods are implemented. As described below in detail, a CPU model included in a simulation apparatus executes the target program so that operations of the target program are verified by use of the simulation apparatus.

Figure 2:
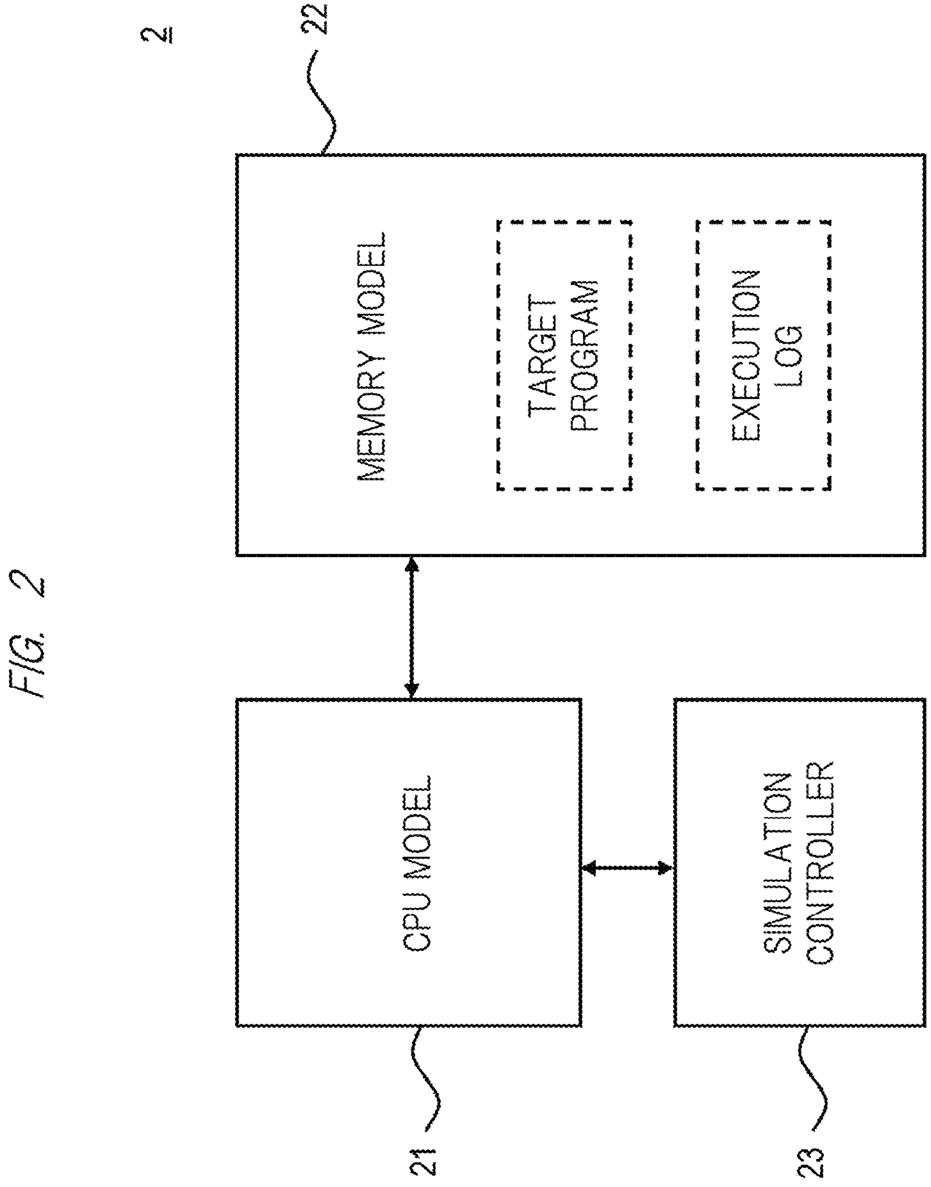
FIG. 2 is a block diagram illustrating a configuration example of a simulation apparatus according to a first embodiment.

FIG. 2 is a block diagram illustrating a configuration example of a simulation apparatus 2 according to the first embodiment. As illustrated in FIG. 2, the simulation apparatus 2 includes a CPU model 21, a memory model 22, and a simulation controller 23. The CPU model 21 and the memory model 22 are modelled intellectual property (IP) blocks, the IP blocks being included in a semiconductor device on which the target program operates. The semiconductor device includes a CPU for executing the target program and a memory for storing the target program. The CPU in the semiconductor device is simulated by the CPU model 21 and the memory in the semiconductor device is simulated by the memory model 22.

The CPU model 21 reads the target program stored in the memory model 22 and executes an instruction included in the target program. The CPU model 21 outputs a simulation elapsed time for which the instruction included in the target program is executed. The CPU model 21 outputs an execution log in response to a processing performed by executing the instruction included in the target program.

The memory model 22 stores the target program. The memory model 22 is connected to the CPU model 21 and stores the execution log output from the CPU model 21.

The simulation controller 23 is connected to the CPU model 21 and receives, from the CPU model 21, the simulation elapsed time for which the instruction included in the target program is executed. The simulation controller 23 manages a simulation time on the basis of the simulation elapsed time received from the CPU model 21.

Figure 3:
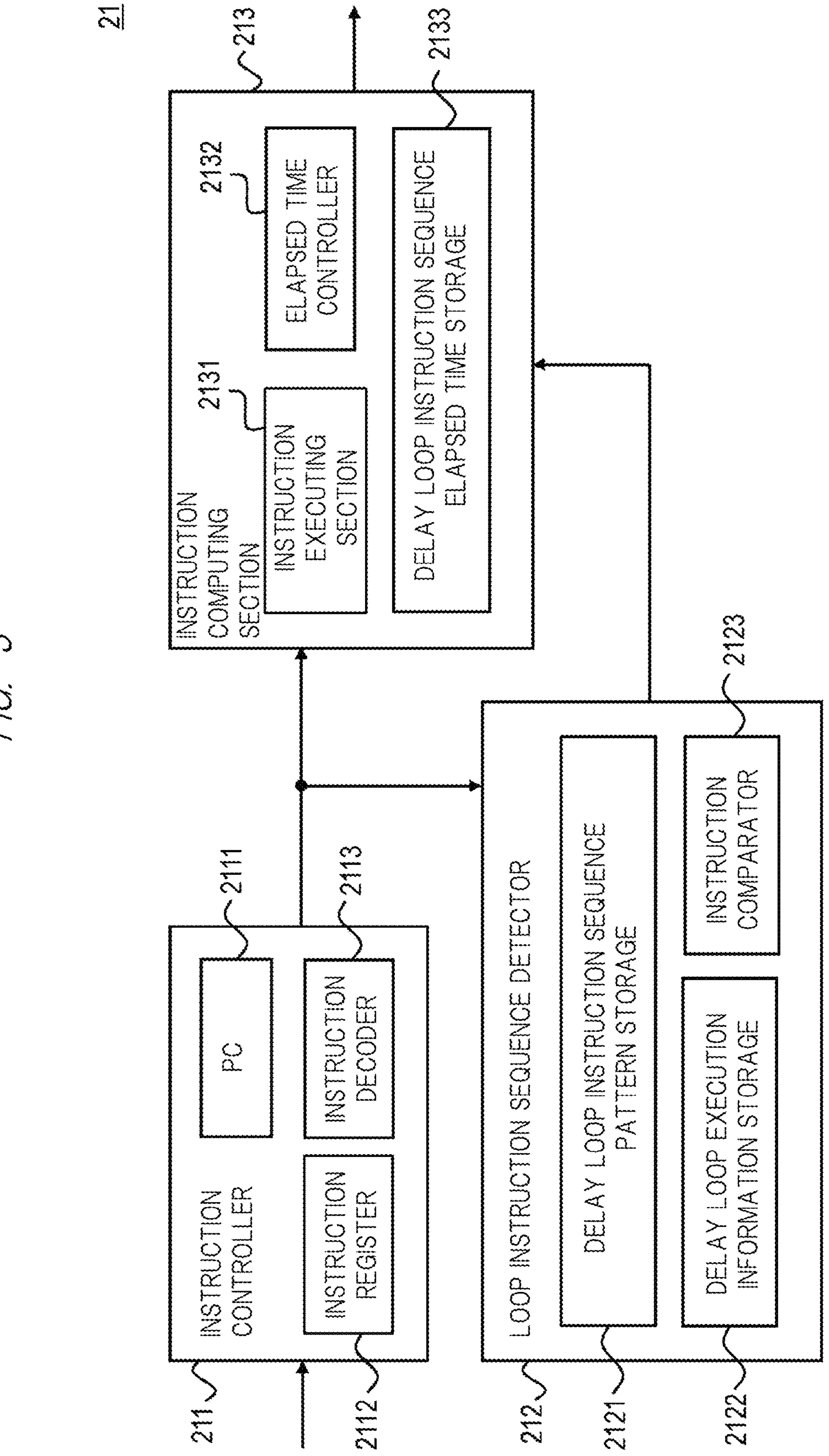
FIG. 3 is a block diagram illustrating a configuration example of a CPU model according to the first embodiment.

The CPU model 21 will be described below in detail. FIG. 3 is a block diagram illustrating a configuration example of the CPU model 21 according to the first embodiment. As illustrated in FIG. 3, the CPU model 21 includes an instruction controller 211, a loop instruction sequence detector 212, and an instruction computing section 213.

The instruction controller 211 includes a program counter (PC) 2111, an instruction register 2112, and an instruction decoder 2113. The PC 2111 stores a PC value used to fetch an instruction included in the target program. The instruction register 2112 is directed toward storing the fetched instruction. The instruction controller 211 fetches an instruction to be executed next based on the PC value stored in the PC 2111, and stores the fetched instruction in the instruction register 2112. The PC value is incremented whenever an instruction is fetched, and is updated to the address indicating where the next instruction is stored.

The instruction decoder 2113 is connected to the instruction register 2112. The instruction decoder 2113 decodes the instruction stored in the instruction register 2112 or the instruction included in the target program thereby generating a decode result. The decode result of the instruction is output to the loop instruction sequence detector 212 and the instruction computing section 213.

The loop instruction sequence detector 212 includes a delay loop instruction sequence pattern storage 2121, a delay loop execution information storage 2122, and an instruction comparator 2123. The loop instruction sequence detector 212 may detect a delay loop instruction sequence included in the target program by use of the delay loop instruction sequence pattern storage 2121, the delay loop execution information storage 2122, and the instruction comparator 2123.

A loop instruction sequence will be described below. Loop processings are used to create a waiting state required for shifting a state of the CPU. In the loop processings, predetermined processings are repeatedly performed without state transition of the CPU. An instruction sequence used in the repeatedly executed processings is referred to as a loop instruction sequence in the present disclosure. The CPU repeatedly executes the loop instruction sequence thereby implementing the waiting state without state transition of the CPU.

Figure 4:
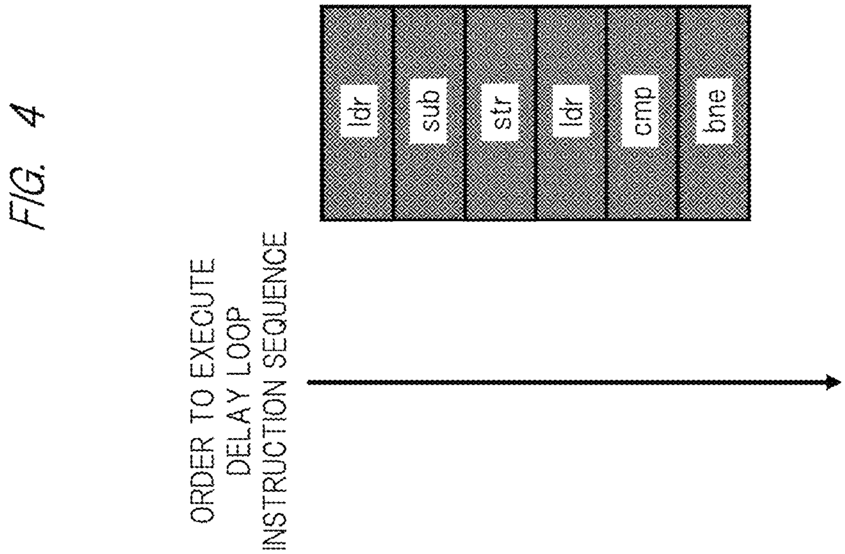
FIG. 4 is a diagram illustrating an example of a delay loop instruction sequence.

An example of the loop instruction sequence may be a delay loop instruction sequence. Loop processings using a delay loop instruction sequence are referred to as a delay loop in the present disclosure. FIG. 4 is a diagram illustrating an example of the delay loop instruction sequence. As illustrated in FIG. 4, the delay loop instruction sequence includes an ldr instruction, an sub instruction, an str instruction, an ldr instruction, a cmp instruction, and a bne instruction. The delay loop instruction sequence is executed in chronological order from the ldr instruction toward the bne instruction.

The ldr instruction is to read a value from the memory and to store it in a general-purpose register in the CPU. The sub instruction is to perform subtraction on two values and to store a computation result in the general-purpose register in the CPU. The str instruction is to read the value from the general-purpose register in the CPU and to store it in the memory. The cmp instruction is to compare two values, to set a flag of a status register in the CPU at 1 when the two values match, and to set the flag of the status register in the CPU at 0 when the two values do not match. The bne instruction is to branch to a predetermined instruction when the flag of the status register in the CPU is 0.

Operations of the delay loop implemented by the delay loop instruction sequence of FIG. 4 will be described. The number of times the delay loop instruction sequence is repeated is assumed as M in the following description. M is a natural number of 2 or more.

At first, with the ldr instruction, M is read from the memory and is stored in the general-purpose register in the CPU. Next, with the sub instruction, 1 is subtracted from M stored in the general-purpose register in the CPU, and a computation result of M−1 is stored in the general-purpose register in the CPU. Next, with the str instruction, M−1 is read from the general-purpose register in the CPU and is stored in the memory.

Next, with the ldr instruction again, M−1 is read from the memory and is stored in the general-purpose register in the CPU. Next, with the cmp instruction, M−1 and 0 are compared and a comparison result of not matched is obtained so that the flag of the status register in the CPU is set at 0. Next, with the bne instruction, the processing branches to the first ldr instruction since the flag of the status register in the CPU is 0, and the delay loop instruction sequence of FIG. 4 is completed once.

Since whenever the sub instruction is executed, 1 is subtracted from the computation result, when the delay loop instruction sequence is repeatedly executed M times, the computation result is 0. When the computation result is 0 with the sub instruction, the flag of the status register in the CPU is set at 1 with the cmp instruction. Accordingly, with the bne instruction, the processing does not branch to the first ldr instruction and exits the loop of executing the delay loop instruction sequence. As described above, the delay loop instruction sequence is repeatedly executed M times to implement the delay loop.

Returning to FIG. 3, the configuration of the CPU model 21 will be subsequently described. The delay loop instruction sequence pattern storage 2121 stores a delay loop instruction sequence pattern which defines a delay loop instruction sequence included in the target program and to be repeatedly executed.

The delay loop instruction sequence pattern includes information on the types of instructions configuring the delay loop instruction sequence and an order to execute the instructions. For example, in the example of FIG. 4, the delay loop sequence instruction pattern includes information indicating that the delay loop instruction sequence is configured of the ldr instruction, the sub instruction, the str instruction, the ldr instruction, the cmp instruction, and the bne instruction and is executed in this order.

The delay loop execution information storage 2122 stores delay loop execution information on the delay loop instruction sequence being executed. The delay loop execution information includes information indicating whether the CPU model 21 is executing an instruction in the delay loop instruction sequence, information indicating which instruction in the instructions included in the delay loop instruction sequence is being executed while the delay loop instruction sequence is being executed, and the like.

The instruction comparator 2123 sequentially compares the instructions included in the target program with the delay loop instruction sequence pattern, and generates a delay loop instruction sequence detection signal indicating that the plurality of instructions included in the target program match the delay loop instruction sequence pattern. The delay loop instruction sequence detection signal generated by the instruction comparator 2123 is output to the instruction computing section 213.

Specifically, the instruction comparator 2123 sequentially receives the instruction decode results output from the instruction controller 211. The instruction comparator 2123 receives the delay loop instruction sequence pattern stored in the delay loop instruction sequence pattern storage 2121. The instruction comparator 2123 sequentially compares the instruction decode results with the delay loop instruction sequence pattern in the order in which it receives the instruction decode results.

When detecting that an instruction compared matches the first instruction in the delay loop instruction sequence defined in the delay loop instruction sequence pattern, the instruction comparator 2123 generates delay loop execution information and stores it in the delay loop execution information storage 2122. The delay loop execution information includes information indicating that the delay loop instruction sequence is being executed and information indicating that the first instruction in the delay loop instruction sequence is being executed.

When detecting that an instruction compared next matches the second instruction in the delay loop instruction sequence defined in the delay loop instruction sequence pattern, the instruction comparator 2123 updates the delay loop execution information to the information indicating that the second instruction in the delay loop instruction sequence is being executed. To the contrary, when not detecting that the instruction compared next matches the second instruction in the delay loop instruction sequence defined in the delay loop instruction sequence pattern, the instruction comparator 2123 deletes the delay loop execution information stored in the delay loop execution information storage 2122.

As described above, when detecting that a plurality of instructions compared matches the delay loop instruction sequence defined in the delay loop instruction sequence pattern after performing the comparison processing on the plurality of instructions, the instruction comparator 2123 generates a delay loop instruction sequence detection signal and deletes the delay loop execution information stored in the delay loop execution information storage 2122.

For example, in the delay loop instruction sequence of FIG. 4, the instruction comparator 2123 consecutively receives the decode results of the ldr instruction to the bne instruction in the order of FIG. 4. The instruction comparator 2123 generates the delay loop execution information based on the result of the comparison processing on the first ldr instruction, then sequentially updates the delay loop execution information based on the results of the comparison processing on the sub instruction to the cmp instruction, and finally generates the delay loop instruction sequence detection signal based on the result of the comparison processing on the bne instruction.

When a plurality of delay loop instruction sequences is included in the target program, the delay loop instruction sequence pattern storage 2121 may store a plurality of delay loop instruction sequence patterns. In this case, the instruction comparator 2123 compares instructions with a delay loop instruction sequence pattern, generates delay loop execution information, and generates a delay loop instruction sequence detection signal per delay loop instruction sequence.

As described above, the delay loop instruction sequence is a loop instruction sequence. Thus, the delay loop instruction sequence pattern storage 2121 may be referred to as a loop instruction sequence pattern storage a loop for storing instruction sequence pattern which defines a loop instruction sequence included in the target program and to be repeatedly executed. The instruction comparator 2123 may sequentially compare instructions included in the target program with the loop instruction sequence pattern and may generate a loop instruction sequence detection signal indicating that the plurality of instructions included in the target program match the loop instruction sequence pattern.

The instruction computing section 213 includes an instruction executing section 2131, an elapsed time controller 2132, and a delay loop instruction sequence elapsed time storage 2133.

The instruction executing section 2131 is connected to the instruction controller 211 and receives an instruction decode result generated by the instruction decoder 2113. The instruction executing section 2131 executes an instruction included in the target program based on the instruction decode result.

The elapsed time controller 2132 generates a simulation elapsed time for which an instruction included in the target program is executed. For example, the elapsed time controller 2132 acquires information on the number of clock cycles required for executing the instructions from the instruction executing section 2131 and finds a product of the number of clock cycles and a clock cycle thereby generating the simulation elapsed time.

The elapsed time controller 2132 determines when to output the generated simulation elapsed time, and collectively outputs the generated simulation elapsed time to the simulation controller 23 at predetermined intervals. The interval at which the simulation elapsed time is output may be preset in the simulation apparatus 2. The simulation elapsed time output from the elapsed time controller 2132 is used by the simulation controller 23 to manage a simulation time.

The delay loop instruction sequence elapsed time storage 2133 stores a delay loop instruction sequence elapsed time. The delay loop instruction sequence elapsed time is based on a simulation elapsed time required for executing the delay loop instruction sequence once. The delay loop instruction sequence elapsed time may be based on the simulation elapsed time required for executing the delay loop instruction sequence once and may be the simulation elapsed time required for executing the delay loop instruction sequence once.

When the delay loop instruction sequence detection signal is generated, the instruction computing section 213 may not repeatedly execute the delay loop instruction sequence. When receiving the delay loop instruction sequence detection signal, the instruction computing section 213 recognizes that the delay loop instruction sequence detection signal is generated by the instruction comparator 2123. When the delay loop instruction sequence detection signal is generated, the instruction executing section 2131 executes the delay loop instruction sequence once but does not repeatedly execute the delay loop instruction sequence, that is, does not repeatedly execute the remaining M−1 times. The instruction executing section 2131 acquires M, which is the number of times to repeat the delay loop instruction sequence, by executing the delay loop instruction sequence once, and outputs it to the elapsed time controller 2132.

When the delay loop instruction sequence detection signal is generated, the elapsed time controller 2132 generates a simulation elapsed time required for repeatedly executing the delay loop instruction sequence M times. Specifically, the elapsed time controller 2132 receives the number of times of repetition M from the instruction executing section 2131. The elapsed time controller 2132 receives the simulation elapsed time required for executing the delay loop instruction sequence once, which is the delay loop instruction sequence elapsed time, from the delay loop instruction sequence elapsed time storage 2133. The elapsed time controller 2132 generates the simulation elapsed time required for repeatedly executing the delay loop instruction sequence M times by multiplying the simulation elapsed time required for executing the delay loop instruction sequence once by M, and outputs it to the simulation controller 23.

As described above, the PC value is incremented whenever an instruction is fetched, and is updated to the address indicating where the next instruction is stored. When the delay loop instruction sequence detection signal is generated, the delay loop instruction sequence is not repeatedly executed. That is, the processing of branching to the first instruction in the delay loop instruction sequence is ordinarily performed when the instruction executing section 2131 executes the delay loop instruction sequence, but is not performed by the simulation apparatus 2 according to the first embodiment. That is, the delay loop instruction sequence is not executed and the PC value is not updated to the address of the branching destination. Thus, when the delay loop instruction sequence detection signal is generated, the instruction controller 211 does not fetch the first instruction in the delay loop instruction sequence but fetches the next instruction in the delay loop instruction sequence based on the PC value.

As described above, when the delay loop instruction sequence detection signal is generated, the instruction executing section 2131 executes the delay loop instruction sequence once, and the elapsed time controller 2132 outputs a simulation elapsed time required for executing the delay loop instruction sequence a predetermined number of times (M times) based on the delay loop instruction sequence elapsed time.

As described above, the delay loop instruction sequence is a loop instruction sequence. Thus, the delay loop instruction sequence elapsed time storage 2133 may be referred to as a loop instruction sequence elapsed time storage for storing a loop instruction sequence elapsed time based on a simulation elapsed time required for executing a loop instruction sequence once. When a loop instruction sequence detection signal is generated, the instruction executing section 2131 may execute the loop instruction sequence once, and the elapsed time controller 2132 may output a simulation elapsed time required for executing the loop instruction sequence a predetermined number of times based on the loop instruction sequence elapsed time.

Figure 6:
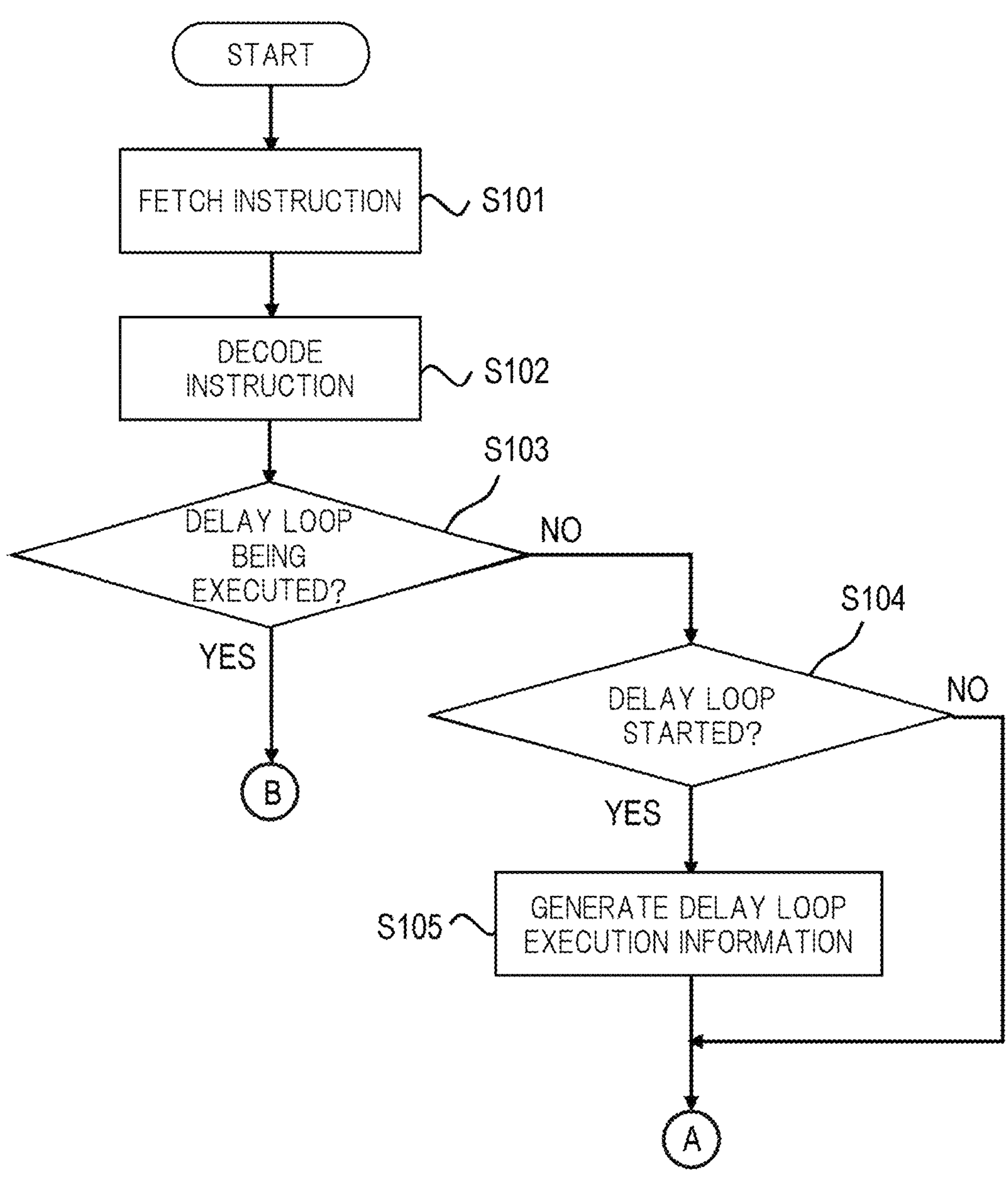
FIG. 6 is a flowchart illustrating an example of a flow of instruction executing processings by the CPU model according to the first embodiment.
Figure 7:
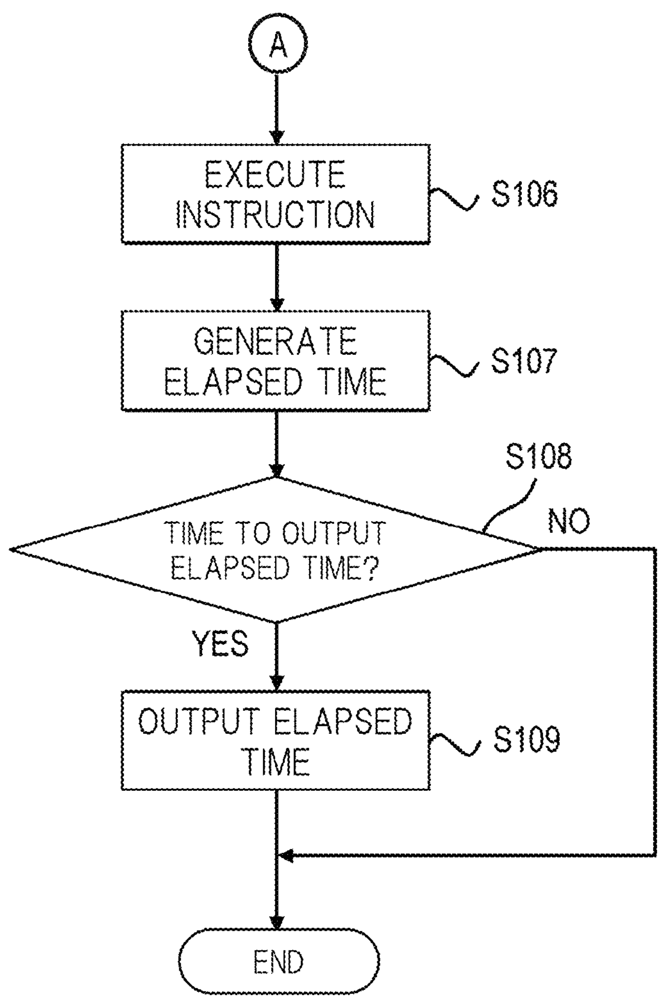
FIG. 7 is a flowchart illustrating the example of the flow of instruction executing processings by the CPU model according to the first embodiment.
Figure 8:
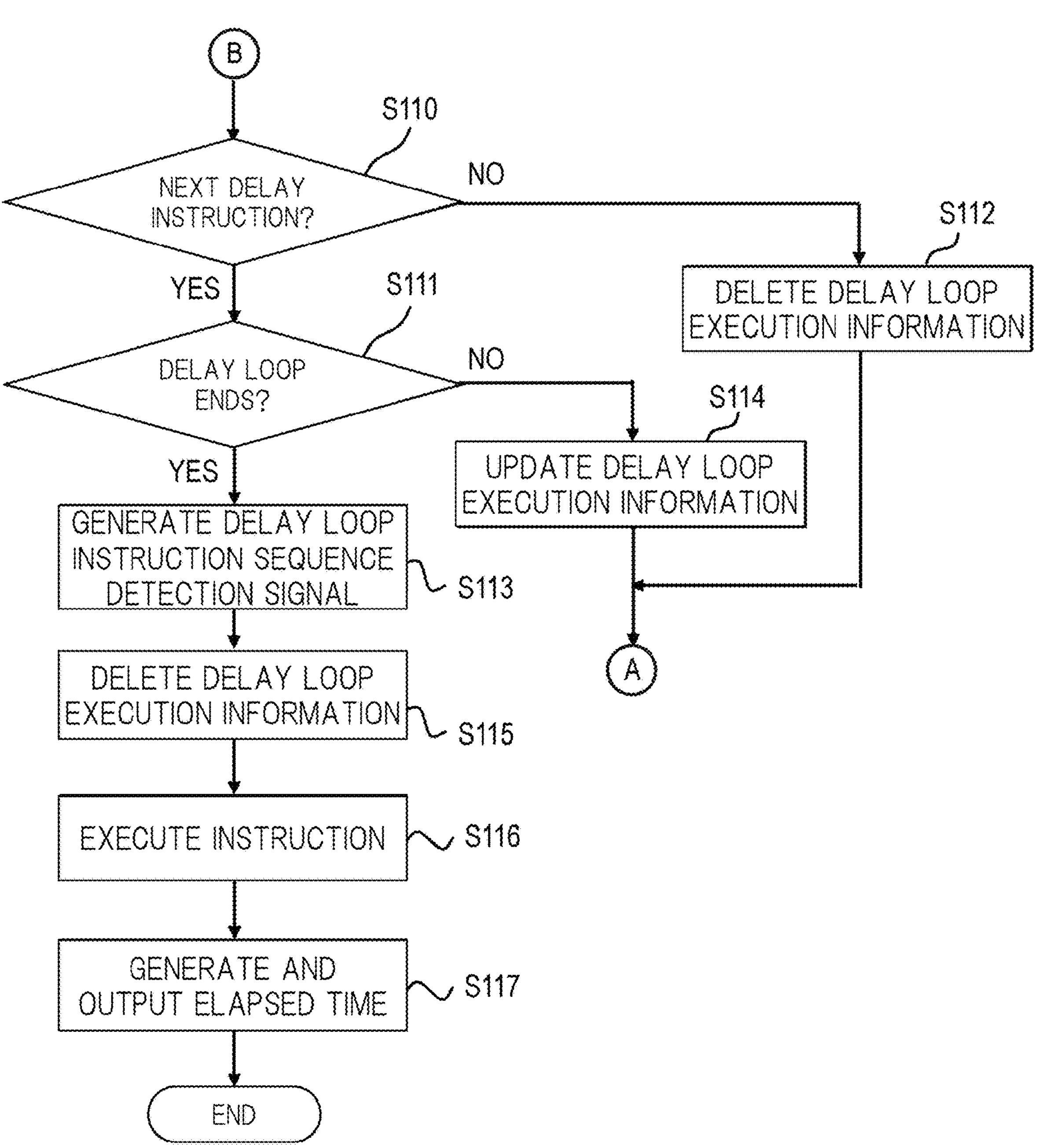
FIG. 8 is a flowchart illustrating the example of the flow of instruction executing processings by the CPU model according to the first embodiment.

The processings of executing instructions included in the target program by the CPU model 21 according to the first embodiment will be described below with reference to FIGS. 5 to 8. FIG. 5 is a diagram illustrating an example of an order to execute a plurality of instructions including delay loop instruction sequences. FIGS. 6 to 8 are flowcharts illustrating the example of the flow of instruction executing processings by the CPU model 21 according to the first embodiment.

FIG. 5 illustrates a plurality of xxx instructions and a plurality of delay loop instruction sequences. The delay loop instruction sequence of FIG. 4 is illustrated by way of example and is repeatedly executed M times (M loops). The instructions of FIG. 5 are sequentially executed in chronological order.

As illustrated in FIG. 5, the xxx instructions are executed between time t0 and time t1 and after time t3. The instructions are other than the instructions in the loop instruction sequence. The CPU model 21 executes the xxx instructions and performs the processings for the xxx instructions.

A period between time t1 and time t3 is a period in which the delay loop instruction sequence is repeatedly executed M times. When the target program is executed on an actual semiconductor device, the delay loop instruction sequence is repeatedly executed throughout the period between time t1 and time t3. When the delay loop instruction sequence is detected, however, the CPU model 21 according to the first embodiment executes the delay loop instruction sequence once between time t1 and time t2 but does not repeatedly execute the remaining delay loop instruction sequence M−1 times between time t2 and time t3.

As described above, the CPU model 21 executes the delay loop instruction sequence and performs the processings for the delay loop instruction sequence between time t1 and time t2. In other words, the simulation apparatus 2 executes the instructions included in the target program to do simulations between time t1 and time t2. To the contrary, the CPU model 21 neither executes the delay loop instruction sequence nor performs the processings for the delay loop instruction sequences between time t2 and time t3. In other words, the simulation apparatus 2 does not do simulations by executing the instructions included in the target program between time t2 and time t3.

The processings of executing the instructions of FIG. 5 by the CPU model 21 will be described below in detail with reference to FIGS. 6 to 8.

At first, the xxx instructions are sequentially executed between time t0 and time t1 in FIG. 5. In step S101 of FIG. 6, the instruction controller 211 fetches an xxx instruction included in the target program based on the PC value stored in the PC 2111 and stores the fetched xxx instruction in the instruction register 2112. The instruction fetching processing is performed so that the PC value is incremented and is updated to the address indicating where the next instruction is stored.

In step S102, the instruction decoder 2113 decodes the xxx instruction stored in the instruction register 2112 and generates an xxx instruction decode result. The xxx instruction decode result is output to the loop instruction sequence detector 212 and the instruction computing section 213.

In step S103, the instruction comparator 2123 determines whether the delay loop instruction sequence is being executed based on delay loop execution information. An instruction in the loop instruction sequence is not included and the delay loop execution information is not generated between time t0 and time t1. Thus, the processing proceeds to NO in step S103 and then to step S104.

In step S104, the instruction comparator 2123 compares the xxx instruction result output from the instruction controller 211 with the delay loop instruction sequence pattern and determines whether a delay loop instruction n sequence executing processing has been started. The xxx instructions are not included in the delay loop instruction sequence, and thus the processing proceeds to NO in step S104 and then to the flow of FIG. 7.

In step S106 of FIG. 7, the instruction executing section 2131 executes the xxx instruction based on the xxx instruction decode result generated by the instruction decoder 2113 and performs the processings for the xxx instruction.

In step S107, the elapsed time controller 2132 generates a simulation elapsed time for which the xxx instruction is executed.

In step S108, the elapsed time controller 2132 determines when to output the generated simulation elapsed time to the simulation controller 23. When it is determined that the generated simulation elapsed time is to be output (YES in step S108), the processing proceeds to step S109. To the contrary, when it is determined that the generated simulation elapsed time is not to be output (NO in step S108), the elapsed time controller 2132 keeps the generated simulation elapsed time to be output at the next timing.

In step S109, the elapsed time controller 2132 outputs the generated simulation elapsed time to the simulation controller 23. If a simulation elapsed time is kept or a simulation elapsed time generated at a previous timing is present, the elapsed time controller 2132 outputs, to the simulation controller 23, a simulation elapsed time which is obtained by adding a simulation elapsed time generated at the current timing and the simulation elapsed time generated at the previous timing. A series of processings for the xxx instruction are completed in this manner.

Next, the delay loop instruction sequence is executed between time t1 and time t2 in FIG. 5. In step S101 of FIG. 6, the instruction controller 211 fetches the ldr instruction included in the target program based on the PC value stored in the PC 2111, and stores the fetched ldr instruction in the instruction register 2112. As illustrated in FIG. 5, the fetched ldr instruction is the first instruction in the delay loop instruction sequence. The instruction fetching processing is performed, and thus the PC value is incremented and is updated to the address indicating where the next instruction is stored or where the sub instruction is stored.

In step S102, the instruction decoder 2113 decodes the ldr instruction stored in the instruction register 2112 and generates an ldr instruction decode result. The ldr instruction decode result is output to the loop instruction sequence detector 212 and the instruction computing section 213.

In step S103, the instruction comparator 2123 determines whether the delay loop instruction sequence is being executed based on delay loop execution information. The delay loop execution information is not generated as of this moment, and thus the processing proceeds to NO in step S103 and then to step S104.

In step S104, the instruction comparator 2123 compares the ldr instruction decode result output from the instruction controller 211 with the delay loop instruction sequence pattern, and determines whether the delay loop instruction sequence executing processing has been started. The ldr instruction is the first instruction included in the delay loop instruction sequence, and thus the instruction comparator 2123 determines that the delay loop instruction sequence executing processing has been started (YES in step S104), and the processing proceeds to step S105.

In step S105, the instruction comparator 2123 generates delay loop execution information. The delay loop execution information includes information indicating the first ldr instruction in the delay loop instruction sequence is being executed. The instruction comparator 2123 stores the delay loop execution information in the delay loop execution information storage 2122.

In step S106 of FIG. 7, the instruction executing section 2131 executes the ldr instruction and performs the processings for the ldr instruction based on the ldr instruction decode result generated by the instruction decoder 2113.

In step S107, the elapsed time controller 2132 generates a simulation elapsed time for which the ldr instruction is executed.

The processings in steps S108 and S109 are performed similarly to the xxx instruction executing processing described above. A series of processings for the ldr instruction as the first instruction in the delay loop instruction sequence are completed in this manner.

Subsequent to the ldr instruction executing processing, the sub instruction executing processing is performed. The sub instruction is the second instruction included in the delay loop instruction sequence. In step S101 of FIG. 6, the instruction controller 211 fetches the sub instruction. In step S102, the instruction decoder 2113 decodes the fetched sub instruction and generates an sub instruction decode result.

In step S103, the instruction comparator 2123 determines whether the delay loop instruction sequence is being executed based on delay loop execution information. The delay loop execution information indicating that the delay loop instruction sequence is being executed is stored in the delay loop execution information storage 2122, and thus the processing proceeds to YES in step S103 and then to the flow of FIG. 8.

In step S110 of FIG. 8, the instruction comparator 2123 compares the sub instruction decode result with the delay loop instruction sequence pattern. The instruction comparator 2123 determines whether the sub instruction is to be executed next in the delay loop instruction sequence based on the comparison result and the delay loop execution information. That is, a determination is made here as to whether the instructions included in the delay loop instruction sequence are being executed in the appropriate order. The delay loop execution information stored in the delay loop execution information storage 2122 includes the information indicating that the first ldr instruction in the delay loop instruction sequence is being executed, and thus the instruction comparator 2123 determines that the sub instruction is to be executed next in the delay loop instruction sequence (YES in step S110), and the processing proceeds to step S111.

In step S111, the instruction comparator 2123 compares the sub instruction decode result with the delay loop instruction sequence pattern and determines whether the delay loop instruction sequence ends. That is, a determination is made here as to whether the last instruction included in the delay loop instruction sequence is to be executed. The sub instruction is not the last instruction in the delay loop instruction sequence, and thus the instruction comparator 2123 determines that the delay loop instruction sequence does not end (NO in step S111), and the processing proceeds to step S114.

In step S114, the instruction comparator 2123 updates the delay loop execution information. The instruction comparator 2123 updates the delay loop execution information to the information indicating that the second sub instruction in the delay loop instruction sequence is being executed, and stores the updated information in the delay loop execution information storage 2122. Thereafter, the processing proceeds to the flow of FIG. 7. The processings of FIG. 7 are performed and thus a series of processings for the sub instruction as the second instruction in the delay loop instruction sequence are completed.

The str instruction, the ldr instruction, and the cmp instruction subsequent to the sub instruction are executed similarly to the sub instruction. When the executing processings are not performed in the order of the instructions in the delay loop instruction sequence defined in the delay loop instruction sequence pattern (NO in step S110), the instruction comparator 2123 determines that the delay loop instruction sequence is not being executed, and deletes the delay loop execution information stored in the delay loop execution information storage 2122 (step S112).

The bne instruction as the last instruction in the delay loop instruction sequence is executed similarly to the sub instruction up to step S110 of FIG. 8. In step S111 of FIG. 8, the instruction comparator 2123 compares a bne instruction decode result with the delay loop instruction sequence pattern, and determines whether the delay loop instruction sequence ends. The bne instruction is the last instruction in the delay loop instruction sequence, and thus the instruction comparator 2123 determines that the delay loop instruction sequence ends (YES in step S111), and the processing proceeds to step S113.

In step S113, the instruction comparator 2123 generates a delay loop instruction sequence detection signal. The generated delay loop instruction sequence detection signal is output to the instruction computing section 213.

In step S115, the instruction comparator 2123 deletes the delay loop execution information stored in the delay loop execution information storage 2122.

In step S116, the instruction executing section 2131 executes the bne instruction and performs the processings for the bne instruction based on the bne instruction decode result generated by the instruction decoder 2113 and the delay loop instruction sequence detection signal. The instruction executing section 2131 receives the delay loop instruction sequence detection signal from the instruction comparator 2123 and recognizes that the delay loop instruction sequence detection signal has been generated. When the delay loop instruction sequence detection signal is generated, the instruction executing section 2131 performs the same processings as the delay loop instruction sequence is executed M times so as not to repeatedly execute the delay loop instruction sequence. That is, the processing of branching to the first ldr instruction in the delay loop instruction sequence, which is performed in response to the executed bne instruction, is not performed, and the PC value in the PC 2111 is not updated to the address indicating where the first ldr instruction in the delay loop instruction sequence is stored.

The instruction executing section 2131 outputs, to the elapsed time controller 2132, M as the number of times to repeat the delay loop instruction sequence acquired by executing the delay loop instruction sequence once.

In step S117, the elapsed time controller 2132 generates a simulation elapsed time required for executing the delay loop instruction sequence M times based on the delay loop instruction sequence elapsed time stored in the delay loop instruction sequence elapsed time storage 2133 and M output from the instruction executing section 2131. The generated simulation elapsed time is output to the simulation controller 23. The delay loop instruction sequence executing processing is performed between time t1 and time t2 in FIG. 5 in this manner.

As described above, the delay loop instruction sequence is not repeatedly executed by the simulation apparatus 2 according to the first embodiment. That is, ordinarily the delay loop instruction sequence is repeatedly executed M−1 times according to the program between time t2 and time t3 in FIG. 5, but the delay loop instruction sequence is not repeatedly executed M−1 times by the simulation apparatus 2 according to the first embodiment.

Finally, the xxx instructions are executed after time t3 in FIG. 5. At time t3, the instruction controller 211 fetches the xxx instruction subsequent to the delay loop instruction sequence based on the PC value stored in the PC 2111 (step S101). The subsequent processings are executed similarly to the xxx instructions between time t0 and time t1. A series of processings of executing the instructions including the delay loop instruction sequences of FIG. 5 are performed in this manner.

As described above, according to the first embodiment, the loop instruction sequence detector 212 detects a loop instruction sequence included in the target program and generates a loop instruction sequence detection signal. When the loop instruction sequence detection signal is generated, the instruction executing section 2131 executes the loop instruction sequence once. The elapsed time controller 2132 generates a simulation elapsed time required for executing the loop instruction sequence a predetermined number of times (the delay loop instruction sequence of FIG. 4 is executed M times, for example).

As described above, the simulation apparatus 2 according to the first embodiment does not repeatedly execute the loop instruction sequence, which is included in the target program but for which a state of the CPU model 21 does not shift, a predetermined number of times (the delay loop instruction sequence of FIG. 4 is executed M−1 times, for example). Thereby, a time to do simulations can be further shortened than the target program is executed. That is, a time to verify operations of software, which is performed by confirming whether a state of the CPU model 21 is to be shifted, can be reduced.

Second Embodiment

A second embodiment will be described. The simulation apparatus for executing a target program including a delay loop instruction sequence as an example of a loop instruction sequence has been described according to the first embodiment. A simulation apparatus for executing a target program including a polling loop instruction sequence as another example of the loop instruction sequence will be described according to the second embodiment.

Figure 9:
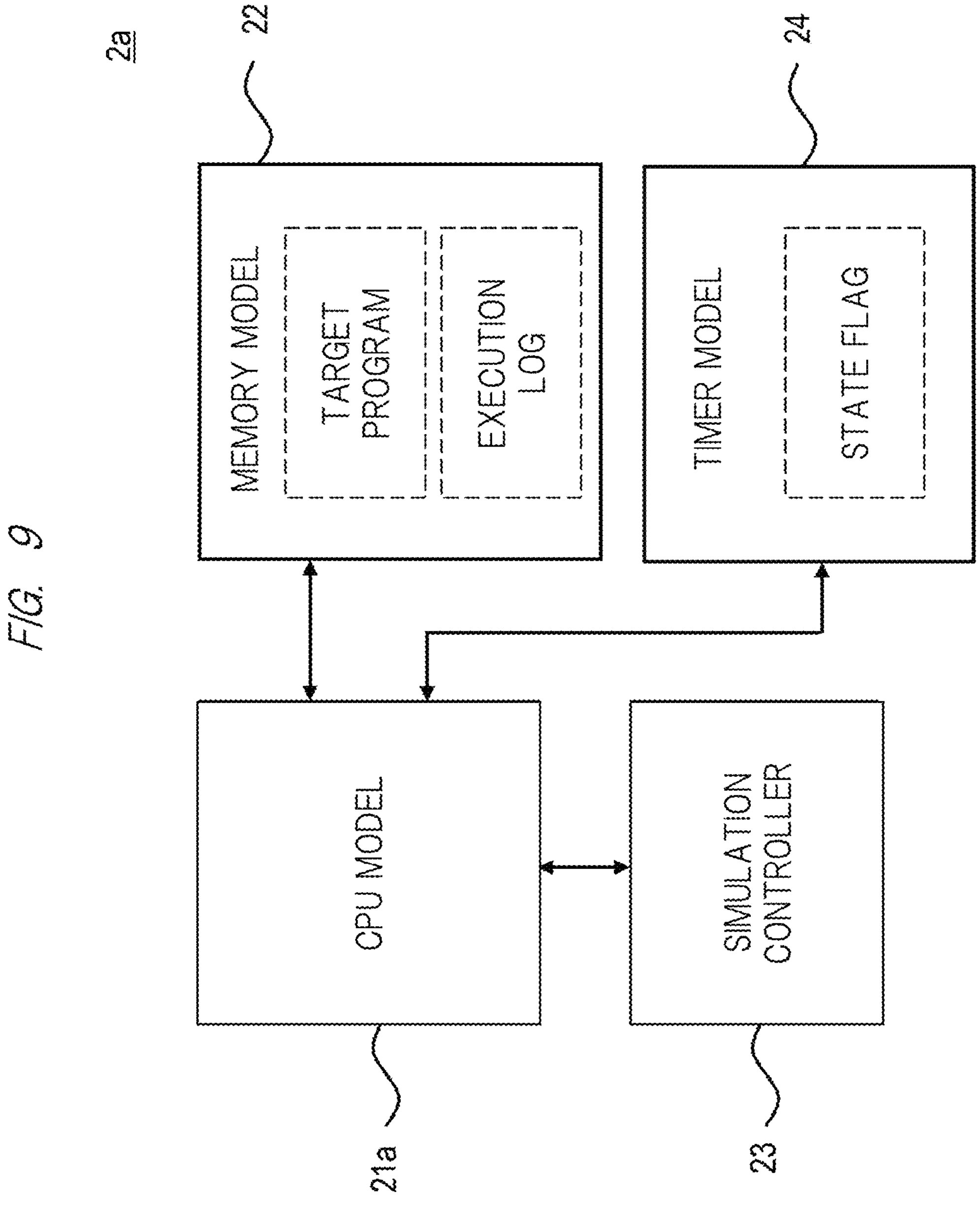
FIG. 9 is a block diagram illustrating a configuration example of a simulation apparatus according to a second embodiment.

FIG. 9 is a block diagram illustrating a configuration example of a simulation apparatus 2*a* according to the second embodiment. As illustrated in FIG. 9, the simulation apparatus 2*a* according to the second embodiment includes a timer model 24 in addition to the components of the simulation apparatus 2 according to the first embodiment. A CPU model 21*a* is provided instead of the CPU model 21.

A timer, which is included in a semiconductor device on which the target program operates, is modeled to be the timer model 24. That is, the timer in the semiconductor device is simulated by the timer model 24.

The timer model 24 is a slave model which operates in response to an instruction of the CPU model 21*a* as a master model. The timer model 24 has a state flag (F). The timer model 24 starts measuring a time in response to an instruction from the CPU model 21*a*, and may change the state flag after a preset time elapses. For example, when the initial state of the state flag is 0, the state flag is changed from 0 to 1 after the preset time elapses.

Figure 10:
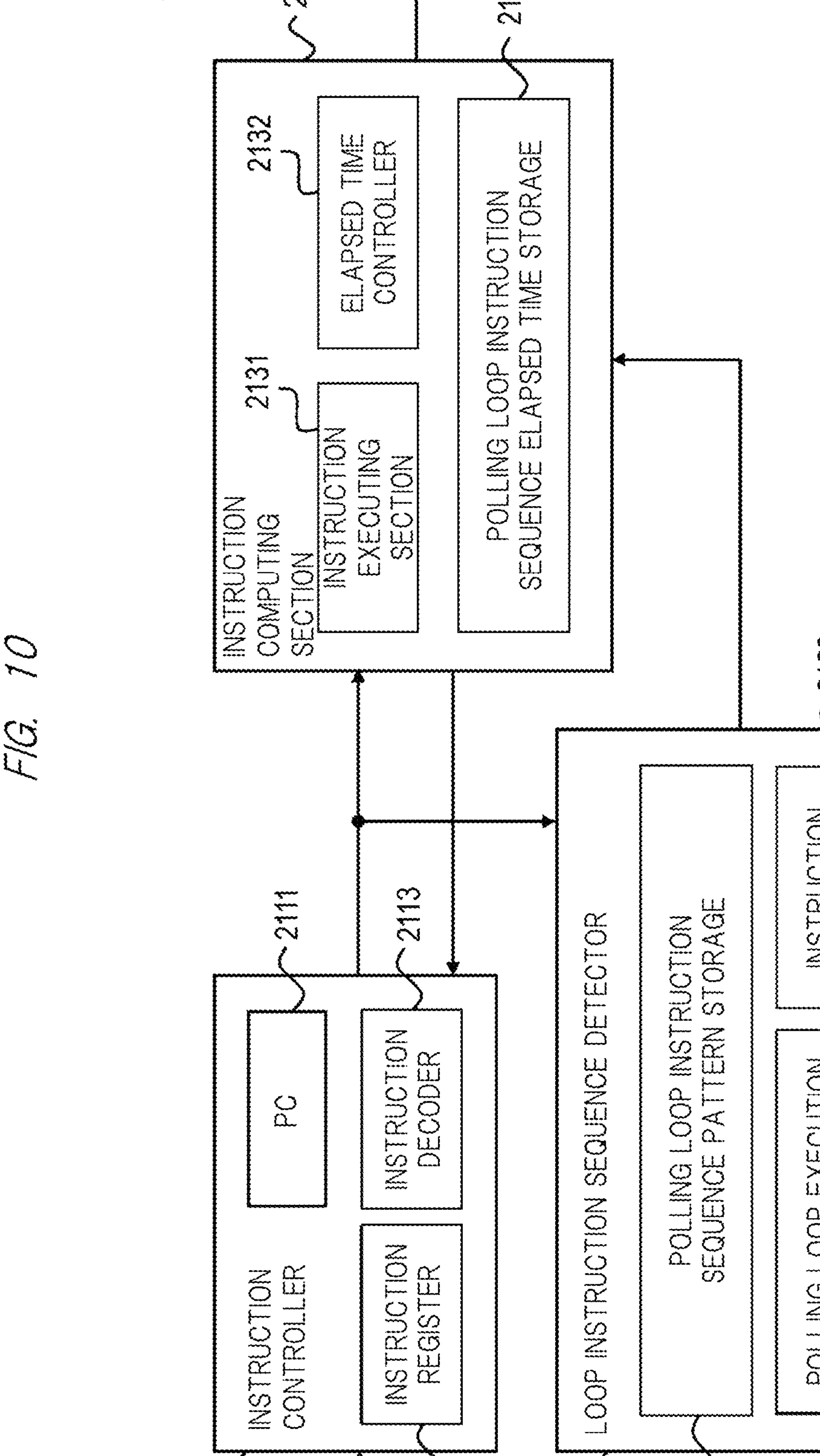
FIG. 10 is a block diagram illustrating a configuration example of a CPU model according to the second embodiment.

The CPU model 21*a* will be described below. FIG. 10 is a block diagram illustrating a configuration example of the CPU model 21*a* according to the second embodiment. As illustrated in FIG. 10, the loop instruction sequence detector 212 and the instruction computing section 213 in the CPU model 21 according to the first embodiment are replaced with a loop instruction sequence detector 212*a* and an instruction computing section 213*a* in the CPU model 21*a* according to the second embodiment, respectively.

The loop instruction sequence detector 212*a* includes the instruction comparator 2123, a polling loop instruction sequence pattern storage 2124, and a polling loop execution information storage 2125. The loop instruction sequence detector 212*a* according to the second embodiment may detect a polling loop instruction sequence included in the target program by use of the polling loop instruction sequence pattern storage 2124, the polling loop execution information storage 2125, and the instruction comparator 2123.

Figure 11:
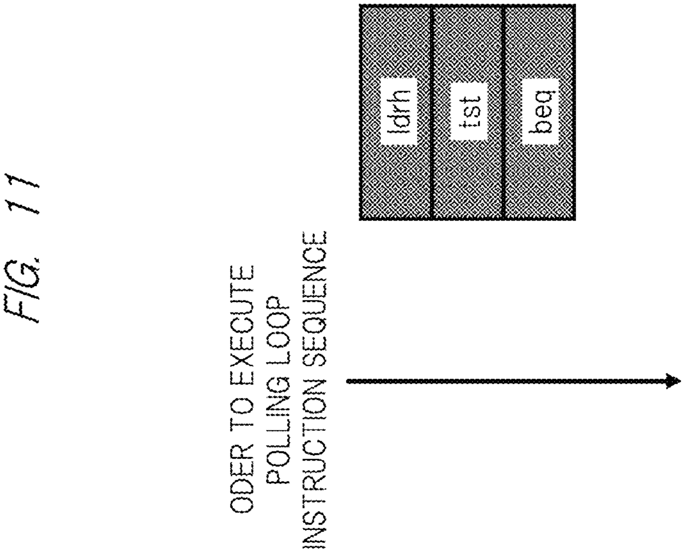
FIG. 11 is a diagram illustrating an example of a polling loop instruction sequence.

The polling loop instruction sequence is an exemplary loop instruction sequence similarly to the delay loop instruction sequence. Loop processings using a polling loop instruction sequence are referred to as a polling loop in the present disclosure. FIG. 11 is a diagram illustrating an example of a polling loop instruction sequence. As illustrated in FIG. 11, the polling loop instruction sequence includes an ldrh instruction, a tst instruction, and a beq instruction. The polling loop instruction sequence is executed in chronological order from the ldrh instruction to the beq instruction.

The ldrh instruction is to read a value from the memory, to change the bit width for the value, and to store the value with the bit width changed in the general-purpose register in the CPU. The tst instruction is to confirm whether the value is 0, to set the flag of the status register in the CPU at 1 when the value is 0, and to set the flag of the status register in the CPU at 0 when the value is not 0. The beq instruction is to branch to a predetermined instruction when the flag of the status register in the CPU is 1.

Operations of the polling loop implemented by use of the polling loop instruction sequence of FIG. 11 will be described. At first, with the ldrh instruction, the state flag of the slave is read and is changed in the bit width to be stored in the general-purpose register in the CPU. Next, with the tst instruction, whether the value of the state flag is 0 is confirmed. When the state flag of the slave is 0 in the initial state, the flag of the status register in the CPU is set at 1. Next, with the beq instruction, the processing branches to the first ldrh instruction since the flag of the status register in the CPU is 1, and the polling loop instruction sequence of FIG. 11 is completed once.

The polling loop instruction sequence is repeatedly executed until the state flag of the slave is changed from 0 to 1. When the state flag of the slave is changed to 1, with the tst instruction, the flag of the status register in the CPU is set at 0. Thereby, the beq instruction is executed so that the processing does not branch to the first ldrh instruction and exits the loop of executing the polling loop instruction sequence. As described above, the polling loop instruction sequence includes an instruction to confirm the state flag of the slave and is repeatedly executed until a change in the state flag is confirmed.

Returning to FIG. 10, the configuration of the CPU model 21*a* will be subsequently described. The polling loop instruction sequence pattern storage 2124 stores a polling loop instruction sequence pattern which defines a polling loop instruction sequence included in the target program and to be repeatedly executed. As described above, the polling loop instruction sequence is a loop instruction sequence, and thus the polling loop instruction sequence pattern storage 2124 may be referred to as a loop instruction sequence pattern storage for storing a loop instruction sequence pattern which defines a loop instruction sequence included in the target program and to be repeatedly executed.

The polling loop instruction sequence pattern includes information on the types of instructions configuring the polling loop instruction sequence and an order to execute the instructions. For example, in the example of FIG. 11, the polling loop instruction sequence includes information pattern indicating that the polling loop instruction sequence is configured of the ldrh instruction, the tst instruction, and the beq instruction and the instructions are executed in this order.

The polling loop execution information storage 2125 stores polling loop execution information on the polling loop instruction sequence being executed. The polling loop execution information includes information indicating whether the CPU model 21*a* is executing an instruction in the polling loop instruction sequence, information indicating which instruction in the polling loop instruction sequence is being executed while the polling loop instruction sequence is being executed, and the like.

The instruction comparator 2123 sequentially compares the instructions included in the target program with the polling loop instruction sequence pattern, and generates a polling loop instruction sequence detection signal indicating that the plurality of instructions included in the target programs match the polling loop instruction sequence pattern. The polling loop instruction sequence detection signal generated by the instruction comparator 2123 is output to the instruction computing section 213*a*.

Specifically, the instruction comparator 2123 sequentially receives the instruction decode results output from the instruction controller 211. The instruction comparator 2123 further receives the polling loop instruction sequence pattern stored in the polling loop instruction sequence pattern storage 2124. The instruction comparator 2123 sequentially compares the instruction decode results with the polling loop instruction sequence pattern in the order in which it receives the instruction decode results.

When detecting that an instruction compared matches the first instruction in the polling loop instruction sequence defined in the polling loop instruction sequence pattern, the instruction comparator 2123 generates polling loop execution information and stores it in the polling loop execution information storage 2125. The polling loop execution information includes information indicating that the polling loop instruction sequence is being executed and information indicating that the first instruction in the polling loop instruction sequence is being executed.

When detecting that an instruction compared next matches the second instruction in the polling loop instruction sequence defined in the polling loop instruction sequence pattern, the instruction comparator 2123 updates the polling loop execution information indicating that the second information to the instruction in the polling loop instruction sequence is being executed. To the contrary, when not detecting that the instruction compared next matches the second instruction in the polling loop instruction sequence defined in the polling loop instruction sequence pattern, the instruction comparator 2123 deletes the polling loop execution information stored in the polling loop execution information storage 2125.

As described above, when performing the comparison processing on a plurality of instructions and then detecting that the plurality of instructions compared matches the polling loop instruction sequence defined in the polling loop instruction sequence pattern, the instruction comparator 2123 generates a polling loop instruction sequence detection signal, and deletes the polling loop execution information stored in the polling loop execution information storage 2125.

For example, for the polling loop instruction sequence of FIG. 11, the instruction comparator 2123 consecutively receives the decode results of the ldrh instruction to the beq instruction in the order of FIG. 11. The instruction comparator 2123 generates polling loop execution information based on the result of the comparison processing on the first ldrh instruction, then updates the polling loop execution information based on the result of the comparison processing on the tst instruction, and finally generates a polling loop instruction sequence detection signal based on the result of the comparison processing on the third beq instruction.

When a plurality of polling loop instruction sequences is included in the target program, the polling loop instruction sequence pattern storage 2124 may store a plurality of polling loop instruction sequence patterns. In this case, the instruction comparator 2123 compares instructions with a polling loop instruction sequence pattern, generates polling loop execution information, and generates a polling loop instruction sequence detection signal per polling loop instruction sequence.

The instruction computing section 213*a* includes the instruction executing section 2131, the elapsed time controller 2132, and a polling loop instruction sequence elapsed time storage 2134.

The polling loop instruction sequence elapsed time storage 2134 stores a polling loop instruction sequence elapsed time. The polling loop instruction sequence elapsed time is a simulation elapsed time required for executing the polling loop instruction sequence N times. That is, the polling loop instruction sequence elapsed time is N times longer than a simulation elapsed time required for executing the polling loop instruction sequence once. N is a natural number of 2 or more. As described above, the polling loop instruction sequence is a loop instruction sequence, and thus the polling loop instruction sequence elapsed time storage 2134 may be referred to as a loop instruction sequence elapsed time storage for storing a loop instruction sequence elapsed time based on a simulation elapsed time required for executing a loop instruction sequence once.

When receiving the polling loop instruction sequence detection signal, the instruction computing section 213*a* confirms that the polling loop instruction sequence detection signal has been generated by the instruction comparator 2123. When the polling loop instruction sequence detection signal is generated, the instruction computing section 213*a* operates differently depending on whether the state flag of the timer model 24 has changed.

When the polling loop instruction sequence detection signal is generated, the instruction executing section 2131 executes the polling loop instruction sequence once. When a change in the state flag is not confirmed after the instruction to confirm the state flag is executed, the instruction executing section 2131 generates a control signal for branching to the first instruction in the polling loop instruction sequence and outputs it to the instruction controller 211. The instruction controller 211 updates the PC value stored in the PC 2111 to the address indicating where the first instruction in the polling loop instruction sequence is stored in response to the control signal, and fetches the first instruction in the polling loop instruction sequence based on the updated PC value. The elapsed time controller 2132 generates a simulation elapsed time required for repeatedly executing the polling loop instruction sequence N times based on the polling loop instruction sequence elapsed time stored in the polling loop instruction sequence elapsed time storage 2134, and outputs it to the simulation controller 23.

To the contrary, when a change in the state flag is confirmed after the instruction to confirm the state flag is executed, the instruction executing section 2131 does not generate a control signal for branching to the first instruction in the polling loop instruction sequence. When the control signal is not generated, the processing exits the loop of executing the polling loop instruction sequence. In this case, the instruction controller 211 fetches the next instruction in the polling loop instruction sequence based on the PC value stored in the PC 2111 without fetching the first instruction in the polling loop instruction sequence. The elapsed time controller 2132 does not generate a simulation elapsed time for which the polling loop instruction sequence is executed.

As described above, when the polling loop instruction sequence detection signal is generated, the instruction executing section 2131 executes the polling loop instruction sequence once, and the elapsed time controller 2132 outputs a simulation elapsed time required for executing the polling loop instruction sequence a predetermined number of times (N times) based on the polling loop instruction sequence elapsed time. Specifically, when a change in the state flag is not confirmed after the polling loop instruction sequence is executed once, the instruction executing section 2131 does not execute the polling loop instruction sequence N−1 times, and the elapsed time controller 2132 generates the simulation elapsed time required for repeatedly executing the polling loop instruction sequence N times which is N times longer than the simulation elapsed time required for executing the polling loop instruction sequence once.

Figure 12:
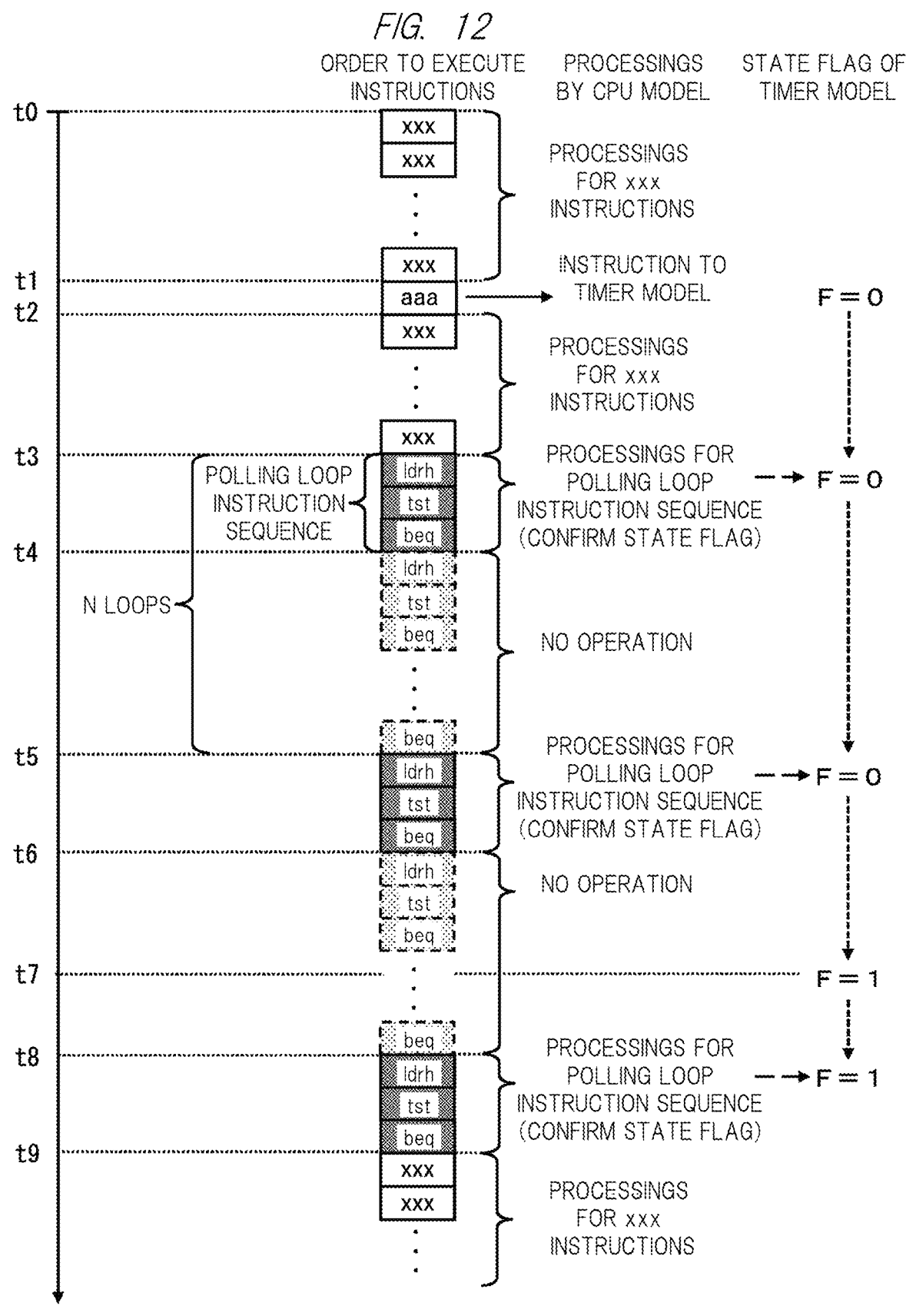
Figure 13:
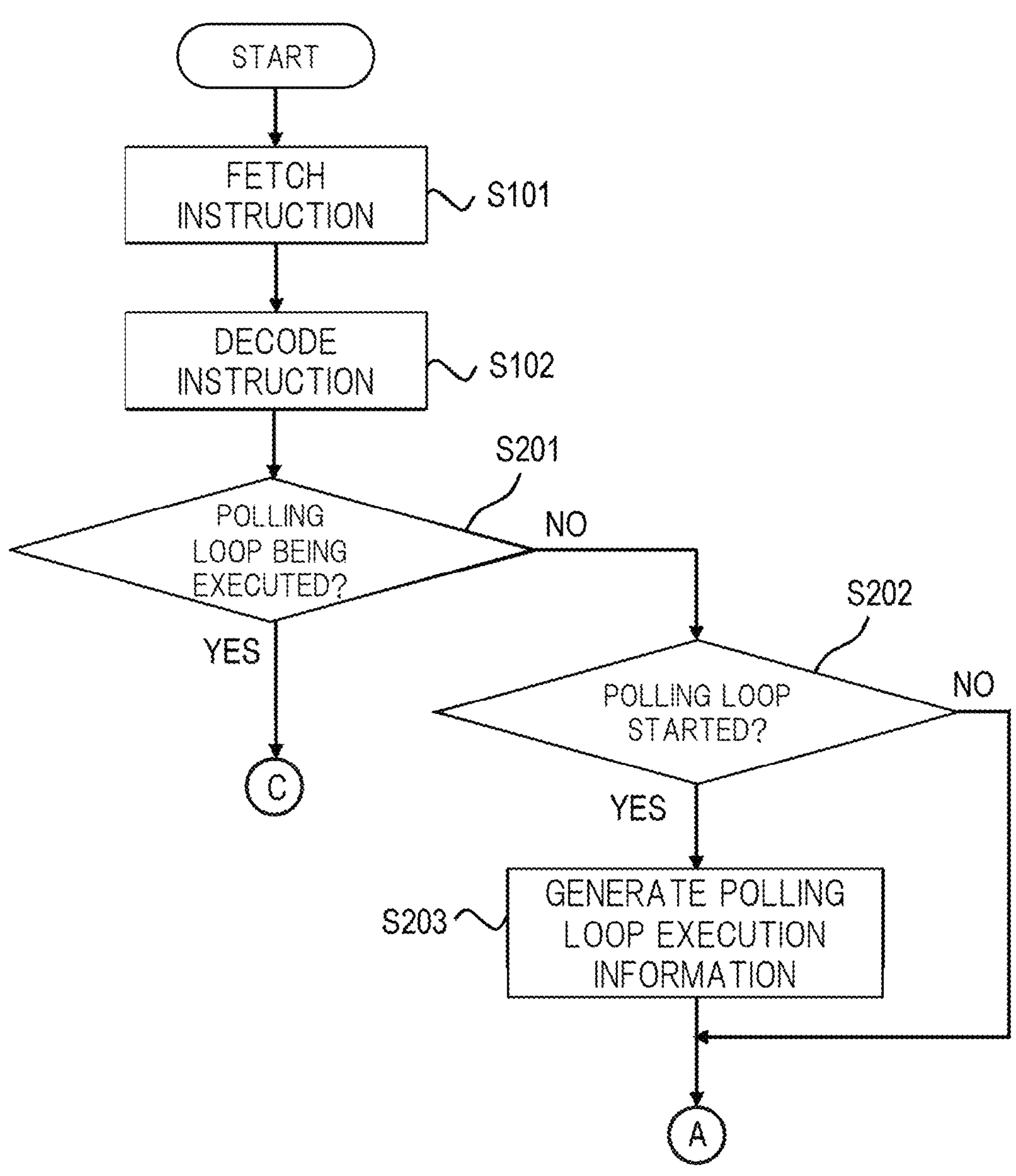
FIG. 13 is a flowchart illustrating an example of a flow of instruction executing processings by the CPU model according to the second embodiment.

Processings of executing instructions included in the target program by the CPU model 21*a* according to the second embodiment will be described below with reference to FIGS. 12 to 14. FIG. 12 is a diagram illustrating an exemplary order to execute a plurality of instructions including polling loop instruction sequences. FIGS. 13 and 14 are flowcharts illustrating an example of a flow of instruction executing processings by the CPU model 21*a* according to the second embodiment.

FIG. 12 illustrates a plurality of xxx instructions, an aaa instruction, and a plurality of polling loop instruction sequences. The aaa instruction is a state flag changing instruction to cause the timer model 24 to change the state flag of the timer model 24 when a state of the timer model 24 shifts. The state flag changing instruction is executed before the polling loop instruction sequence is executed. The polling loop instruction sequence of FIG. 11 is illustrated by way of example. The instructions of FIG. 12 are sequentially executed in chronological order.

As illustrated in FIG. 12, the xxx instructions are executed between time t0 and time t1, between time t2 and time t3, and after time t9. The xxx instructions are executed similarly as in FIG. 5.

The polling loop instruction sequence is repeatedly executed between time t3 and time t9. The CPU model 21*a* performs a polling loop instruction sequence executing processing between time t3 and time t4, between time t5 and time t6, and between time t8 and time t9. In other words, the simulation apparatus 2*a* does simulations by executing the instructions included in the target program in the periods. To the contrary, the CPU model 21*a* does not perform the polling loop instruction sequence executing processing between time t4 and time t5 and between time t6 and time t8. In other words, the simulation apparatus 2*a* does not do simulations by executing the instructions included in the target program in the periods.

It is assumed that when the target program is executed on an actual semiconductor device, the polling loop instruction sequence is executed N−1 times in each of the period between time t4 and time t5 and the period between time t6 and time t8. The polling loop instruction sequence is executed once in each of the period between time t3 and time t4 and the period between time t5 and time t6. Therefore, the polling loop instruction sequence is executed N times (N loops) in each of the period between time t3 and time t5 and the period between time t5 and time t8.

The CPU model 21*a* executes the aaa instruction between time t1 and time t2. It is assumed here that the initial value of the state flag (F) of the timer model 24 is 0 and the timer model 24 changes the state flag from 0 to 1 at time t7 in response to the aaa instruction. Therefore, in the example of FIG. 12, the CPU model 21*a* cannot confirm the change in the state flag between time t3 and time t4 and between time t5 and time t6, and confirms the change in the state flag between time t8 and time t9.

The processings of executing the instructions of FIG. 12 by the CPU model 21*a* will be described below in detail with reference to FIGS. 13 and 14.

At first, the xxx instructions are executed between time to and time t1 in FIG. 12. The xxx instructions are executed similarly as in the first embodiment.

Next, the aaa instruction is executed between time t1 and time t2 in FIG. 12. The aaa instruction is executed similarly to the xxx instructions, but the aaa instruction is a state flag changing instruction and the CPU model 21*a* executes the aaa instruction (state flag changing instruction) thereby instructing the timer model 24 to change the state flag. The timer model 24 starts measuring a time in response to the state flag changing instruction.

Next, the xxx instructions are executed between time t2 and time t3 in FIG. 12. The xxx instructions are executed similarly as in the first embodiment.

Next, the polling loop instruction sequence is executed between time t3 and time t4 in FIG. 12. In step S101 of FIG. 13, the instruction controller 211 fetches the ldrh instruction as the first instruction in the polling loop instruction sequence. In step S102, the instruction decoder 2113 decodes the fetched ldrh instruction and generates an ldrh instruction decode result.

In step S201, the instruction comparator 2123 determines whether the polling loop instruction sequence is being executed based on polling loop execution information. The polling loop execution information is not generated as of this moment, and thus the processing proceeds to NO in step S201 and then to step S202.

In step S202, the instruction comparator 2123 compares the ldrh instruction decode result output from the instruction controller 211 with the polling loop instruction sequence pattern, and determines whether the polling loop instruction sequence executing processing has been started. The ldrh instruction is the first instruction included in the polling loop instruction sequence, and thus the instruction comparator 2123 determines that the polling loop instruction sequence executing processing has been started (YES in step S202), and the processing proceeds to step S203.

In step S203, the instruction comparator 2123 generates polling loop execution information. The polling loop execution information includes information indicating that the first ldrh instruction in the polling loop instruction sequence is being executed. The instruction comparator 2123 stores the polling loop execution information in the polling loop execution information storage 2125.

The processings after step S203 are illustrated in the flowchart of FIG. 7 according to the first embodiment. A series of processings for the ldrh instruction as the first instruction in the polling loop instruction sequence are completed in this manner.

The tst instruction executing processing is performed subsequent to the ldrh instruction executing processing. The tst instruction is the second instruction included in the polling loop instruction sequence. In step S101 of FIG. 13, the instruction controller 211 fetches the tst instruction. In step S102, the instruction decoder 2113 decodes the fetched tst instruction and generates a tst instruction decode result.

In step S201, the instruction comparator 2123 determines whether the polling loop instruction sequence is being executed based on the polling loop execution information. The polling loop execution information indicating that the polling loop instruction sequence is being executed is stored in the polling loop execution information storage 2125, and thus the processing proceeds to YES in step S201 and then to the flow of FIG. 14.

In step S204 of FIG. 14, the instruction comparator 2123 compares the tst instruction decode result with the polling loop instruction sequence pattern. The instruction comparator 2123 determines whether the tst instruction is to be executed next in the polling loop instruction sequence based on the comparison result and the polling loop execution information. That is, a determination is made here as to whether the instructions included in the polling loop instruction sequence are being executed in the appropriate order. The polling loop execution information stored in the polling loop execution information storage 2125 includes the information indicating that the first ldrh instruction in the polling loop instruction sequence is being executed, and thus the instruction comparator 2123 determines that the tst instruction is to be executed next in the polling loop instruction sequence (YES in step S204), and the processing proceeds to step S205.

In step S205, the instruction comparator 2123 compares the tst instruction decode result with the polling loop instruction sequence pattern and determines whether the polling loop instruction sequence ends. That is, a determination is made here as to whether the last instruction included in the polling loop instruction sequence is to be executed. The tst instruction is not the last instruction in the polling loop instruction sequence, and thus the instruction comparator 2123 determines that the polling loop instruction sequence does not end (NO in step S205), and the processing proceeds to step S208.

In step S208, the instruction comparator 2123 updates the polling loop execution information. The tst instruction is the second instruction included in the polling loop instruction sequence, and thus the instruction comparator 2123 updates the polling loop execution information to the information indicating that the second tst instruction in the polling loop instruction sequence is being executed, and stores the updated information in the polling loop execution information storage 2125. The processing then proceeds to the flow of FIG. 7.

In step S106 of FIG. 7, it is confirmed that the tst instruction has been executed and the state flag of the timer model 24 has not changed and remains at the initial value of 0. The processings in and after step S107 are performed, and then a series of processings for the tst instruction as the second instruction in the polling loop instruction sequence are completed.

When the executing processings have not been performed in the order of the instructions in the polling loop instruction sequence defined in the polling loop instruction sequence pattern (NO in step S204), the instruction comparator 2123 determines that the polling loop instruction sequence is not being executed, and deletes the polling loop execution information stored in the polling loop execution information storage 2125 (step S206).

The processing of executing the beq instruction as the last instruction in the polling loop instruction sequence is performed similarly to the tst instruction up to step S204 of FIG. 14. In step S205, the instruction comparator 2123 compares a beq instruction decode result with the polling loop instruction sequence pattern, and determines whether the polling loop instruction sequence ends. The beq instruction is the last instruction in the polling loop instruction sequence, and thus the instruction comparator 2123 determines that the polling loop instruction sequence ends (YES in step S205), and the processing proceeds to step S207.

In step S207, the instruction comparator 2123 generates a polling loop instruction sequence detection signal. The generated polling loop instruction sequence detection signal is output to the instruction computing section 213*a*.

In step S209, the instruction comparator 2123 deletes the polling loop execution information stored in the polling loop execution information storage 2125.

In step S210, the instruction executing section 2131 executes the beq instruction based on the beq instruction decode result generated by the instruction decoder 2113 and the polling loop instruction sequence detection signal.

In step S211, when the processing for the beq instruction is performed, a determination is made as to whether the state flag of the timer model 24 has changed. A change in the state flag of the timer model 24 is not confirmed (NO in step S211), and thus the processing proceeds to step S212.

In step S212, the instruction executing section 2131 generates a control signal for branching to the first instruction in the polling loop instruction sequence. The instruction controller 211 updates the PC value stored in the PC 2111 to the address indicating where the ldrh instruction in the polling loop instruction sequence is stored in response to the control signal.

In step S213, the elapsed time controller 2132 generates a simulation elapsed time required for repeatedly executing the polling loop instruction sequence N times based on the polling loop instruction sequence elapsed time, and outputs it to the simulation controller 23. A series of processings for the beq instruction as the last instruction in the polling loop instruction sequence are completed in this manner.

As described above, the polling loop instruction sequence is not repeatedly executed by the simulation apparatus 2*a* according to the second embodiment between time t4 and time t5 in FIG. 12. That is, ordinarily the polling loop instruction sequence is repeatedly executed N−1 times according to the program, but is not repeatedly executed N−1 times by the simulation apparatus 2*a* according to the second embodiment.

Next, the polling loop instruction sequence is executed again between time t5 and time t6 in FIG. 12. However, the state flag of the timer model 24 still remains unchanged, and thus the polling loop instruction sequence executing processing between time t5 and time t6 is the same as the polling loop instruction sequence executing processing between time t3 and time t4.

The CPU model 21*a* does not perform the polling loop instruction sequence executing processing also between time t6 and time t8 in FIG. 12 similarly as between time t4 and time t5. Thus, the timer model 24 changes the state flag from 0 to 1 at time t7 when a preset time elapses, but the CPU model 21*a* cannot confirm the change in the state flag between time t6 and time t8.

Subsequently, the polling loop instruction sequence is executed again between time t8 and time t9 in FIG. 12. The CPU model 21*a* can confirm the change in the state flag of the timer model 24 between time t8 and time t9, and thus the polling loop instruction sequence executing processing between time t8 and time t9 is different from the polling loop instruction sequence executing processing between time t3 and time t4 in the processings in and after step S211 of FIG. 14.

In step S211, when a change in the state flag of the timer model 24 is confirmed (YES in step S211), the beq instruction executing processing is completed and the processing exits the loop of executing the polling loop instruction sequence. In this case, a control signal for branching to the first instruction in the polling loop instruction sequence is not generated, and the PC value stored in the PC 2111 is not updated.

Finally, the xxx instructions are executed after time t9 in FIG. 12. At time t9, the instruction controller 211 fetches the xxx instruction subsequent to the polling loop instruction sequence based on the PC value stored in the PC 2111 (step S101). The subsequent execution processings are performed similarly to the xxx instructions between time t0 and time t1. A series of processings of executing the instructions including the polling loop instruction sequences of FIG. 12 are performed in this manner.

As described above, according to the second embodiment, the loop instruction sequence detector 212*a* detects a loop instruction sequence included in the target program and generates a loop instruction sequence detection signal. When the loop instruction sequence detection signal is generated, the instruction executing section 2131 executes the loop instruction sequence once. The elapsed time controller 2132 generates a simulation elapsed time required for executing the loop instruction sequence a predetermined number of times (the polling loop instruction sequence of FIG. 11 is executed N times, for example).

As described above, the simulation apparatus 2*a* according to the second embodiment does not repeatedly execute the loop instruction sequence, which is included in the target program but for which a state of the CPU model 21*a* does not shift, a predetermined number of times (the polling loop instruction sequence of FIG. 11 is executed N−1 times, for example). Thereby, the simulation apparatus 2*a* according to the second embodiment can achieve effects similar to those of the simulation apparatus 2 according to the first embodiment.

In the second embodiment, an example of a slave model is the timer model 24, but is not limited thereto. For example, the memory model 22 having a predetermined state flag may be employed as a slave model.

Third Embodiment

A third embodiment will be described. The target program may include both a delay loop instruction sequence and a polling loop instruction sequence. A simulation apparatus for executing the target program including both a delay loop instruction sequence and a polling loop instruction sequence will be described according to the third embodiment.

The simulation apparatus according to the third embodiment includes a CPU model 21*b*, the memory model 22, the simulation controller 23, and the timer model 24. That is, the simulation apparatus according to the third embodiment is different from the simulation apparatus 2*a* according to the second embodiment of FIG. 9 in that the CPU model 21*b* is provided instead of the CPU model 21*a*.

The CPU model 21*b* will be described below. FIG. 15 is a block diagram illustrating a configuration example of the CPU model 21*b* according to the third embodiment. As illustrated in FIG. 15, the CPU model 21*b* according to the third embodiment includes the instruction controller 211, a loop instruction sequence detector 212*b*, and an instruction computing section 213*b*.

The loop instruction sequence detector 212*b* includes the delay loop instruction sequence pattern storage 2121, the delay loop execution information storage 2122, the instruction comparator 2123, the polling loop instruction sequence pattern storage 2124, and the polling loop execution information storage 2125. That is, the loop instruction sequence detector 212*b* according to the third embodiment is configured in a combination of the loop instruction sequence detector 212 according to the first embodiment and the loop instruction sequence detector 212*a* according to the second embodiment. Thereby, the loop instruction sequence detector 212*b* can detect both a delay loop instruction sequence and a polling loop instruction sequence, and can generate a delay loop instruction sequence detection signal and a polling loop instruction sequence detection signal.

The instruction computing section 213*b* includes the instruction executing section 2131, the elapsed time controller 2132, the delay loop instruction sequence elapsed time storage 2133, and the polling loop instruction sequence elapsed time storage 2134. That is, the instruction computing section 213*b* according to the third embodiment is configured in a combination of the instruction computing section 213 according to the first embodiment and the instruction computing section 213*a* according to the second embodiment. Thereby, the elapsed time controller 2132 can generate a simulation elapsed time for each of the delay loop instruction sequence detection signal and the polling loop instruction sequence detection signal.

Figure 16:
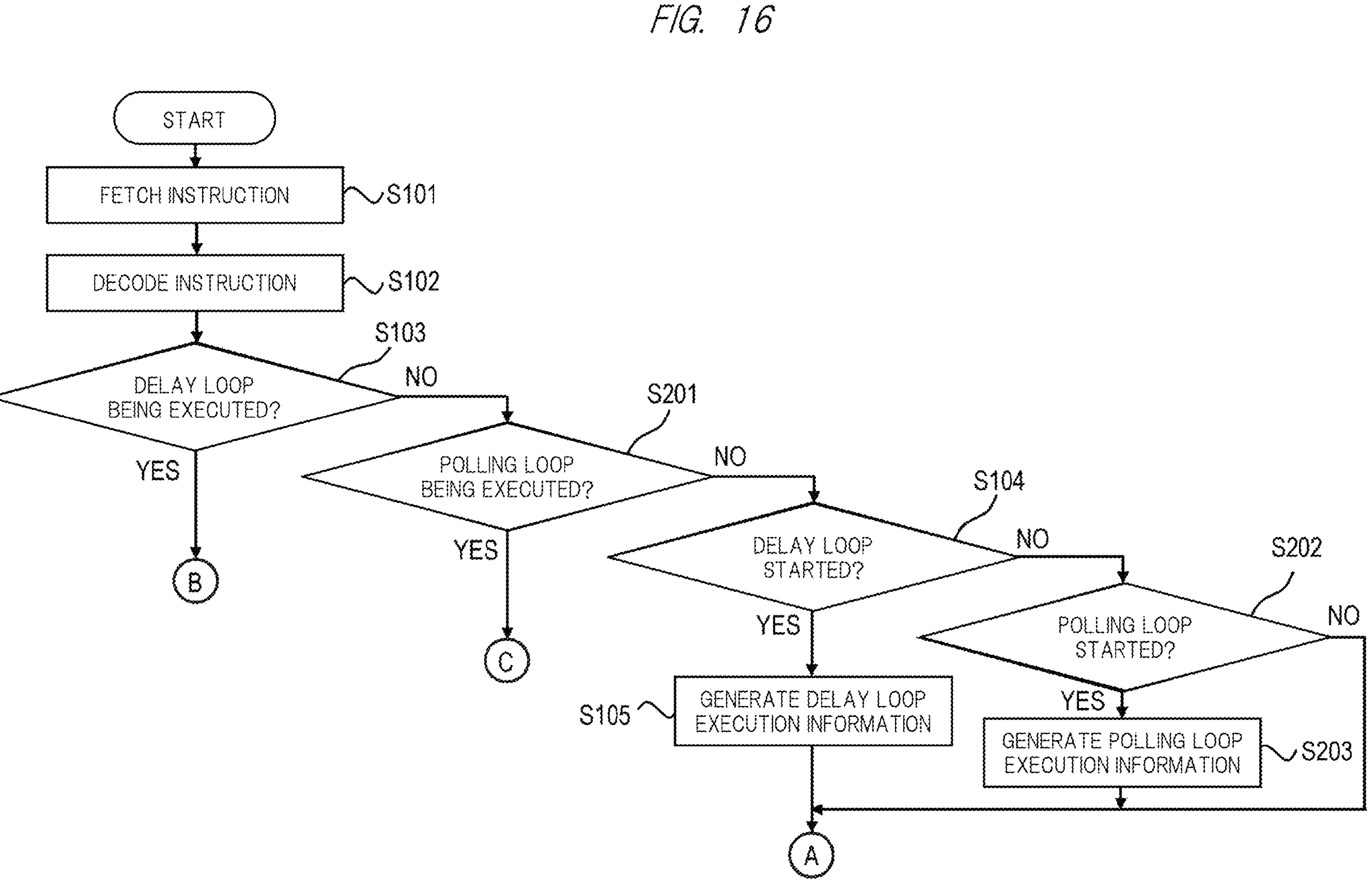
FIG. 16 is a flowchart illustrating an example of a flow of instruction executing processings by the CPU model according to the third embodiment.

FIG. 16 is a flowchart illustrating an exemplary flow of instruction executing processings by the CPU model 21*b* according to the third embodiment. As illustrated in FIG. 16, the flowchart according to the third embodiment includes both the steps for a delay loop instruction sequence and the steps for a polling loop instruction sequence.

In FIG. 16, the steps for a delay loop instruction sequence correspond to step S103 of determining whether the delay loop instruction sequence is being executed, step S104 of determining whether the delay loop instruction sequence executing processing has been started, and step S105 of generating delay loop execution information. Therefore, when the delay loop instruction sequence is being executed, the processing proceeds from step S103 to B after the processings in steps S101 and S102, and the processings in the flowchart of FIG. 8 are then performed. When the delay loop instruction sequence executing processing is started, the processing proceeds to A via steps S104 and S105 after the processings in steps S101, S102, S103, and S201, and the processings in the flowchart of FIG. 7 are then performed.

To the contrary, in FIG. 16, the steps for a polling loop instruction sequence correspond to step S201 of determining whether the polling loop instruction sequence is being executed, step S202 of determining whether the polling loop instruction sequence executing processing has been started, and step S203 of generating polling loop execution information. Therefore, when the polling loop instruction sequence is being executed, the processing proceeds from step S201 to C after the processings in steps S101, S102, and S103, and the processings in the flowchart of FIG. 14 are then performed. When the polling loop instruction sequence executing processing is started, the processing proceeds to A via steps S202 and S203 after the processings in steps S101, S102, S103, S201, and S104, and the processings in the flowchart of FIG. 7 are then performed.

As described above, the simulation apparatus according to the third embodiment can cope with both a delay loop instruction sequence and a polling loop instruction sequence. Therefore, the simulation apparatus 2*b* according to the third embodiment can achieve effects similar to those of the simulation apparatus 2 according to the first embodiment and the simulation apparatus 2*a* according to the second embodiment.

What is claimed is:

1. A simulation apparatus comprising a CPU model, wherein the CPU model comprises:

an instruction controller including an instruction decoder configured to decode an instruction included in a program to be simulated and to generate a decode result;

a loop instruction sequence detector including a loop instruction sequence pattern storage configured to store a loop instruction sequence pattern defining a loop instruction sequence to be repeatedly executed, and an instruction comparator configured to sequentially compare an instruction included in the program to be simulated with the loop instruction sequence pattern and to generate a loop instruction sequence detection signal indicating that a plurality of instructions included in the program to be simulated match the loop instruction sequence pattern; and an instruction computing section including an instruction executing section configured an to execute instruction included in the program to be simulated according to the decode result, an elapsed time controller configured to output a simulation elapsed time for which the instruction executing section executes an instruction included in the program to be simulated, and a loop instruction sequence elapsed time storage configured to store a loop instruction sequence elapsed time based on a simulation elapsed time required for executing the loop instruction sequence once, and wherein, when the loop instruction sequence detection signal is generated, the instruction executing section executes the loop instruction sequence once, and the elapsed time controller generates a simulation elapsed time required for executing the loop instruction sequence a predetermined number of times according to the loop instruction sequence elapsed time.

2. The simulation apparatus according to claim 1, wherein the loop instruction sequence is a delay loop instruction sequence to be repeatedly executed M times, wherein the loop instruction sequence detection signal is a delay loop instruction sequence detection signal, wherein, when the delay loop instruction sequence detection signal is generated, the instruction executing section does not execute the delay loop instruction sequence M−1 times, and the elapsed time controller generates a simulation elapsed time required for repeatedly executing the delay loop instruction sequence M time which is M times longer than a simulation elapsed time required for executing the delay loop instruction sequence once, and wherein M is a natural number of 2 or more.

3. The simulation apparatus according to claim 2, wherein the instruction controller further includes a program counter configured to store a program counter value used to fetch an instruction included in the program to be simulated, and wherein, when the delay loop instruction sequence detection signal is generated, the instruction controller fetches a next instruction in the delay loop instruction sequence according to the program counter value.

4. The simulation apparatus according to claim 2, wherein the loop instruction sequence elapsed time is a delay loop instruction sequence elapsed time, and wherein the delay loop instruction sequence elapsed time is a simulation elapsed time required for executing the delay loop instruction sequence once.

5. The simulation apparatus according to claim 2, wherein the instruction executing section outputs, to the elapsed time controller, M as the number of times to repeatedly execute the delay loop instruction sequence obtained by executing the delay loop instruction sequence once.

6. The simulation apparatus according to claim 1, further comprising a slave model having a state flag, wherein the loop instruction sequence is a polling loop instruction sequence which includes an instruction to confirm the state flag and is repeatedly executed until a change in the state flag is confirmed, wherein the instruction executing section executes a state flag changing instruction to cause the slave model to change the state flag when a state of the slave model shifts before the polling loop instruction sequence is executed, and wherein, when a change in the state flag is not confirmed after the polling loop instruction sequence is executed, the instruction executing section does not execute the polling loop instruction sequence N−1 times, and the elapsed time controller generates a simulation elapsed time required for repeatedly executing the polling loop instruction sequence N time which is N times longer than a simulation elapsed time required for executing the polling loop instruction sequence once, and wherein the N is a natural number of 2 or more.

7. The simulation apparatus according to claim 6, wherein the instruction controller further comprises a program counter configured to store a program counter value used to fetch an instruction included in the program to be simulated, and wherein, when a change in the state flag is not confirmed after the polling loop instruction sequence is executed, the instruction controller fetches a first instruction in the polling loop instruction sequence according to the program counter value.

8. The simulation apparatus according to claim 7, wherein, when a change in the state flag is confirmed after the polling loop instruction sequence is executed, the instruction controller fetches a next instruction in the polling loop instruction sequence according to the program counter value.

9. The simulation apparatus according to claim 6, wherein the loop instruction sequence elapsed time is a polling loop instruction sequence elapsed time, and wherein the polling loop instruction sequence elapsed time is a simulation elapsed time required for executing the polling loop instruction sequence N times.

10. The simulation apparatus according to claim 2, further comprising a slave model having a state flag, wherein the loop instruction sequence pattern is a delay loop instruction sequence pattern, wherein the loop instruction sequence pattern storage is a delay loop instruction sequence pattern storage configured to store the delay loop instruction sequence pattern, wherein the loop instruction sequence elapsed time is a delay loop instruction sequence elapsed time, wherein the loop instruction sequence elapsed time storage is a delay loop instruction sequence elapsed time storage configured to store the delay loop instruction sequence elapsed time, wherein the loop instruction sequence detector further includes a polling loop instruction sequence pattern storage configured to store a polling loop instruction sequence pattern defining a polling loop instruction sequence to be repeatedly executed, wherein the instruction comparator outputs a polling loop instruction sequence detection signal indicating that a plurality of instructions included in the program to be simulated matches the polling loop instruction sequence pattern, wherein the instruction computing section further includes a polling loop instruction sequence elapsed time storage configured to store a polling loop instruction sequence elapsed time based on a simulation elapsed time required for executing the polling loop instruction sequence once, wherein the polling loop instruction sequence is a loop instruction sequence which includes an instruction to confirm the state flag and is repeatedly executed until a change in the state flag is confirmed, wherein, when a state of the slave model shifts before the polling loop instruction sequence is executed, the instruction executing section executes a state flag changing instruction to cause the slave model to change the state flag, wherein, when the polling loop instruction sequence detection signal is generated, the instruction executing section executes the polling loop instruction sequence once, wherein, when a change in the state flag is not confirmed after the polling loop instruction sequence is executed, the instruction executing section does not execute the polling loop instruction sequence N−1 times, and the elapsed time controller outputs a simulation elapsed time required for repeatedly executing the polling loop instruction sequence N times which is N times longer than a simulation elapsed time required for executing the polling loop instruction sequence once, and wherein the N is a natural number of 2 or more.

11. A simulation method performed by a simulation apparatus which comprises a CPU model including a loop instruction sequence pattern storage and a loop instruction sequence elapsed time storage, the simulation method causing the CPU model to:

decode an instruction included in a program to be simulated and to generate a decode result;

store a loop instruction sequence pattern defining a loop instruction sequence to be repeatedly executed in the loop instruction sequence pattern storage;

sequentially compare an instruction included in the program to be simulated with the loop instruction sequence pattern and to generate a loop instruction sequence detection signal indicating that a plurality of instructions included in the program to be simulated matches the loop instruction sequence pattern;

execute an instruction included in the program to be simulated according to the decode result;

output a simulation elapsed time for which an instruction included in the program to be simulated is executed;

store a loop instruction sequence elapsed time based on a simulation elapsed time required for executing the loop instruction sequence once in the loop instruction sequence elapsed time storage; and when the loop instruction sequence detection signal is generated, execute the loop instruction sequence once and to output a simulation elapsed time required for executing the loop instruction sequence a predetermined number of times according to the loop instruction sequence elapsed time.

12. The simulation method according to claim 11, wherein the loop instruction sequence is a delay loop instruction sequence to be repeatedly executed M times, wherein the simulation method further causes the CPU model, when the loop instruction sequence detection signal is generated, not to execute the delay loop instruction sequence M−1 times and to output a simulation elapsed time required for repeatedly executing the delay loop instruction sequence M times which is M times longer than a simulation elapsed time required for executing the delay loop instruction sequence once, and wherein the M is a natural number of 2 or more.

13. The simulation method according to claim 12, wherein the CPU model further includes a program counter configured to store a program counter value used to fetch an instruction included in the program to be simulated, wherein the simulation method further causes the CPU model, when the loop instruction sequence detection signal is generated, to fetch a next instruction in the delay loop instruction sequence according to the program counter value.

14. The simulation method according to claim 11, wherein the simulation apparatus further includes a slave model having a state flag, wherein the loop instruction sequence is a polling loop instruction sequence which includes an instruction to confirm the state flag and is repeatedly executed until a change in the state flag is confirmed, wherein the simulation method further causes the CPU model:

when a state of the slave model shifts before the polling loop instruction sequence is executed, to execute a state flag changing instruction to cause the slave model to change the state flag; and when a change in the state flag is not confirmed after the polling loop instruction sequence is executed, not to execute the polling loop instruction sequence N−1 times and to output a simulation elapsed time required for repeatedly executing the polling loop instruction sequence N times which is N times longer than a simulation elapsed time required for executing the polling loop instruction sequence once, and wherein the N is a natural number of 2 or more.

15. The simulation method according to claim 14, wherein the CPU model further includes a program counter configured to store a program counter value used to fetch an instruction included in the program to be simulated, wherein the simulation method further causes the CPU model, when a change in the state flag is not confirmed after the polling loop instruction sequence is executed, to fetch a first instruction in the polling loop instruction sequence according to the program counter value.

16. A non-transitory computer readable medium storing a program for causing a simulation apparatus, which comprises a CPU model including a loop instruction sequence pattern storage and a loop instruction sequence elapsed time storage, to perform a simulation method, the simulation method causing the CPU model to:

decode an instruction included in a program to be simulated and to generate a decode result;

store a loop instruction sequence pattern defining a loop instruction sequence to be repeatedly executed in the loop instruction sequence pattern storage;

sequentially compare an instruction included in the program to be simulated with the loop instruction sequence pattern and to generate a loop instruction sequence detection signal indicating that a plurality of instructions included in the program to be simulated matches the loop instruction sequence pattern;

execute an instruction included in the program to be simulated according to the decode result;

output a simulation elapsed time for which an instruction included in the program to be simulated is executed;

store a loop instruction sequence elapsed time based on a simulation elapsed time required for executing the loop instruction sequence once in the loop instruction sequence elapsed time storage; and when the loop instruction sequence detection signal is generated, execute the loop instruction sequence once and to output a simulation elapsed time required for executing the loop instruction sequence a predetermined number of times according to the loop instruction sequence elapsed time.

17. The non-transitory computer readable medium according to claim 16, wherein the loop instruction sequence is a delay loop instruction sequence to be repeatedly executed M times, and wherein the simulation method further causes the CPU model, when the loop instruction sequence detection signal is generated, not to execute the delay loop instruction sequence M−1 times and to output a simulation elapsed time required for repeatedly executing the delay loop instruction sequence M times which is M times longer than a simulation elapsed time required for executing the delay loop instruction sequence once, and wherein the M is a natural number of 2 or more.

18. The non-transitory computer readable medium according to claim 17, wherein the CPU model further includes a program counter configured to store a program counter value used to fetch an instruction included in the program to be simulated, wherein the simulation method further causes the CPU model, when the loop instruction sequence detection signal is generated, to fetch a next instruction in the delay loop instruction sequence according to the program counter value.

19. The non-transitory computer readable medium according to claim 16, wherein the simulation apparatus further includes a slave model having a state flag, wherein the loop instruction sequence is a polling loop instruction sequence which includes an instruction to confirm the state flag and is repeatedly executed until a change in the state flag is confirmed, wherein the simulation method further causes the CPU model:

when a state of the slave model shifts before the polling loop instruction sequence is executed, to execute a state flag changing instruction to cause the slave model to change the state flag; and when a change in the state flag is not confirmed after the polling loop instruction sequence is executed, not to execute the polling loop instruction sequence N−1 times and to output a simulation elapsed time required for repeatedly executing the polling loop instruction sequence N times which is N times longer than a simulation elapsed time required for executing the polling loop instruction sequence once, and wherein the N is a natural number of 2 or more.

20. The non-transitory computer readable medium according to claim 19, wherein the CPU model further includes a program counter configured to store a program counter value used to fetch an instruction included in the program to be simulated, wherein the simulation method further causes the CPU model, when a change in the state flag is not confirmed after the polling loop instruction sequence is executed, to fetch a first instruction in the polling loop instruction sequence according to the program counter value.

* * * * *